United States Patent
Saito et al.

(10) Patent No.: US 10,629,348 B2
(45) Date of Patent: Apr. 21, 2020

(54) PERMANENT MAGNET UNIT, ROTATING MACHINE HAVING PERMANENT MAGNET UNIT, AND METHOD FOR MANUFACTURING PERMANENT MAGNET UNIT

(71) Applicant: NITTO DENKO CORPORATION, Ibaraki-shi, Osaka (JP)

(72) Inventors: Shoichiro Saito, Ibaraki (JP); Makoto Fujihara, Ibaraki (JP); Izumi Ozeki, Ibaraki (JP); Kenichi Fujikawa, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 37 days.

(21) Appl. No.: 15/763,033

(22) PCT Filed: Sep. 16, 2016

(86) PCT No.: PCT/JP2016/077368
§ 371 (c)(1),
(2) Date: Mar. 23, 2018

(87) PCT Pub. No.: WO2017/051769
PCT Pub. Date: Mar. 30, 2017

(65) Prior Publication Data
US 2018/0240581 A1    Aug. 23, 2018

(30) Foreign Application Priority Data
Sep. 25, 2015  (JP) .................................. 2015-188723

(51) Int. Cl.
*H01F 7/02*    (2006.01)
*H02K 1/28*   (2006.01)
(Continued)

(52) U.S. Cl.
CPC .......... *H01F 7/0215* (2013.01); *H01F 1/057* (2013.01); *H01F 7/02* (2013.01); *H01F 41/0266* (2013.01);
(Continued)

(58) Field of Classification Search
CPC .. H02K 1/00; H02K 1/04; H02K 1/27; H02K 1/276; H02K 1/277; H01F 7/00;
(Continued)

(56) References Cited

U.S. PATENT DOCUMENTS

| 7,405,503 | B2* | 7/2008 | Aoyama | ................ | H02K 1/276 |
| | | | | | 310/156.53 |
| 2002/0121827 | A1* | 9/2002 | Kaneko | ................... | H02K 1/276 |
| | | | | | 310/156.43 |

(Continued)

FOREIGN PATENT DOCUMENTS

| CN | 101978577 A | 2/2011 |
| EP | 1237253 A2 | 9/2002 |

(Continued)

OTHER PUBLICATIONS

International Preliminary Report on Patentability for corresponding international application PCT/JP2016/077368 dated Mar. 27, 2018.

(Continued)

*Primary Examiner* — Tran N Nguyen
(74) *Attorney, Agent, or Firm* — Hauptman Ham, LLP

(57) ABSTRACT

The present invention provides a permanent magnet unit in which insulating layers are located at positions where an eddy current can be reduced most effectively. The permanent magnet unit includes at least one insulating layer, and a plurality of permanent magnet pieces located adjacent to each other with the at least one insulating layer in between. The at least one insulating layer is located at positions defined based on a magnitude of an eddy current flowing inside a permanent magnet, corresponding to a change in a magnetic field of the permanent magnet into which a plurality of the permanent magnet pieces are integrally formed without the at least one insulating layer.

13 Claims, 14 Drawing Sheets

(51) Int. Cl.
*H02K 1/04* (2006.01)
*H02K 1/27* (2006.01)
*H01F 1/057* (2006.01)
*H01F 41/02* (2006.01)
*H02K 1/02* (2006.01)

(52) U.S. Cl.
CPC ................ *H02K 1/02* (2013.01); *H02K 1/04* (2013.01); *H02K 1/27* (2013.01); *H02K 1/2706* (2013.01); *H02K 1/28* (2013.01)

(58) Field of Classification Search
CPC . H01F 7/02; H01F 7/021; H01F 41/00; H01F 41/02; H01F 41/025; H01F 41/0253; H01F 7/022; H01F 7/0221
See application file for complete search history.

(56) References Cited

U.S. PATENT DOCUMENTS

| 2003/0104246 | A1* | 6/2003 | Watanabe | ............... H01F 7/021 428/611 |
| 2008/0238234 | A1 | 10/2008 | Saban et al. | |
| 2011/0012460 | A1 | 1/2011 | Ozeki et al. | |

FOREIGN PATENT DOCUMENTS

| EP | 1315267 | A2 | 5/2003 |
| JP | 8-331783 | A | 12/1996 |
| JP | 2000-324736 | A | 11/2000 |
| JP | 2001-25189 | A | 1/2001 |
| JP | 2002-262490 | A | 9/2002 |
| JP | 2002-345189 | A | 11/2002 |
| JP | 2003-164083 | A | 6/2003 |
| JP | 2004-96868 | A | 3/2004 |
| JP | 2009-283568 | A | 12/2009 |

OTHER PUBLICATIONS

"High Speed and High Accuracy Electromagnetic Field Analysis Technique of Rotating Machine", Technical report of The Institute of Electrical Engineers of Japan, No. 1094, pp. 48 to 55, Japan. (2007).

Masaru Kano et al., "Development of Ultra High-Speed Permanent-Magnet Motor Driven by 12-V Power Supply", The 2008 Annal Meeting Record, I.E.E. Japan, No. 5, pp. 16 to 17.(2008).

Masaru Kano et al.,"Discussion on Efficiency and Power Density Improvement of Ultra High-Speed Permanent-Magnet Motor Driven by 12-V Power Supply",The 2008 Annal Meeting Record, I.E.E. Japan, No. 5, pp. 18 to 19. (2008).

International Search Report for PCT/JP2016/077368 dated Dec. 20, 2016, citing the above references.

The extended European search report dated May 10, 2019 for corresponding European Application No. 16848557.1, citing the above references.

Chinese Office Action dated Sep. 3, 2019 for corresponding Chinese Application No. 201680055818.0, citing the above references.

Office Action issued in Taiwanese Patent Application No. 105130843 dated Dec. 10, 2019.

An English translation of Taiwanese Office Action issued for corresponding Taiwanese Application No. 105130843 dated Dec. 10, 2019.

\* cited by examiner

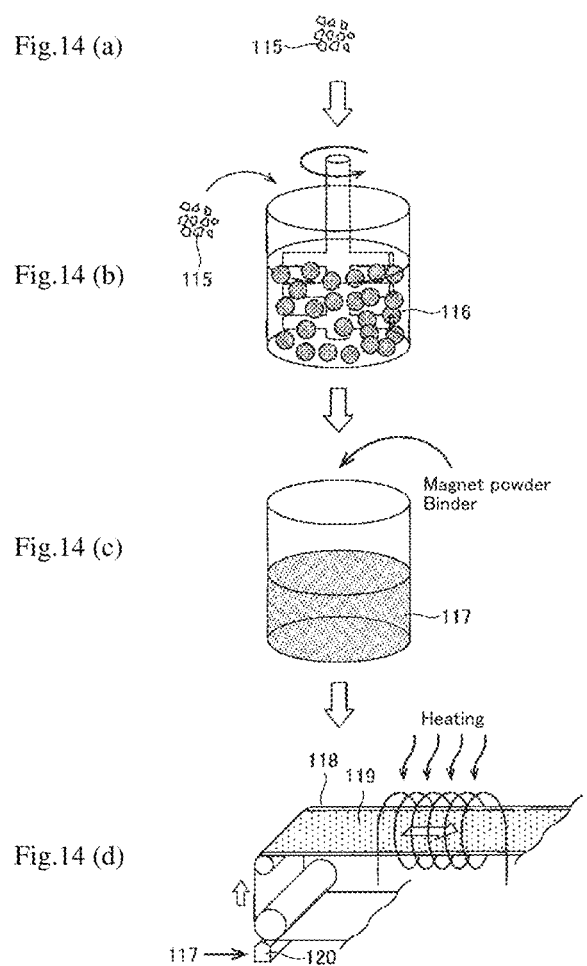

PERMANENT MAGNET UNIT, ROTATING MACHINE HAVING PERMANENT MAGNET UNIT, AND METHOD FOR MANUFACTURING PERMANENT MAGNET UNIT

CROSS REFERENCE TO RELATED APPLICATIONS

This application claims the priority of Japanese Patent Application No. 2015-188723, filed on Sep. 25, 2015, in the Japanese Patent Office. Further, this application is the National Phase application of International Application No. PCT/JP2016/077368 filed on Sep. 16, 2016, which is incorporated herein by reference in its entirety.

TECHNICAL HELD

The present invention relates to a permanent magnet unit used for a rotating machine such as an electric motor or a generator, and specifically, a permanent magnet unit having a structure in which a plurality of permanent magnet pieces are adjacent to each other with an insulating layer in between.

BACKGROUND ART

There has been known, by Patent Document 1 for example, in a permanent magnet rotating machine including a stator and a rotor, an interior permanent magnet (IPM) rotating machine configured such that reluctance torque can also be used in addition to magnet torque by embedding a permanent magnet in a rotor core. In this kind of rotating machine, the rotor core is located opposing to the stator having a plurality of magnetic poles with an air gap in between. Also, slots are formed at equally spaced circumferential positions of the rotor core, and the permanent magnet is inserted into the respective slots.

In addition, there has also been known, in a permanent magnet rotating machine, a surface permanent magnet (SPM) rotating machine in which a cylindrical (also referred as a ring-shaped) permanent magnet is located on a surface of a rotor core. In this kind of rotating machine, the permanent magnet is located opposing to the stator having a plurality of magnetic poles with an air gap in between, and thus, strong magnetism, which the permanent magnet has, can efficiently be used.

In such kind of motors, when the rotor is rotated, a magnetic flux passing through the permanent magnet incorporated in the rotor core changes, and an eddy current is generated inside the permanent magnet to counteract the change in the magnetic flux. When the eddy current is generated inside the permanent magnet, a temperature of the permanent magnet reaches up to a thermal demagnetization region, and magnetic property may be deteriorated. Thus, an eddy-current loss due to such eddy current is desired to be reduced.

As a means for reducing the eddy-current loss, dividing the permanent magnet into a plurality of smaller permanent magnet pieces has been found to be effective. By dividing the permanent magnet into a plurality of permanent magnet pieces, a flow channel of the eddy current flowing through each of permanent magnet pieces becomes longer and a density of eddy current of each of the permanent magnet pieces decreases, thus, the eddy-current loss of the entire permanent magnet is reduced.

As a proposal for such permanent magnet, there is a technique disclosed in Patent Document 2, for example. This technique relates to a permanent magnet which is equally divided in a rotational axis direction or a circumferential direction of a rotor. However, merely dividing one permanent magnet equally into a plurality of permanent magnet pieces may result in dividing not only parts effective for reducing the eddy-current loss, but also parts which have less reduction effect of eddy-current loss. In this case, since parts, which are not necessary to be divided, are divided, not only the eddy-current loss cannot be reduced effectively, but also an entire performance of the magnet could be deteriorated.

As a technique to deal with such problem, a method for positively defining positions to divide a permanent magnet is proposed for a purpose of effectively reducing an eddy-current loss of the permanent magnet.

Patent Document 3 proposes a technique for, in a permanent magnet disposed in a movable member of a rotating machine, reducing an eddy-current loss by dividing the permanent magnet into a plurality of magnets having different width. Such width is defined corresponding to a proportion of change in a magnetic flux density inside the permanent magnet. Such width is made narrower as the proportion of change in the magnetic flux density increases and is made wider as the proportion of the change decreases, and specifically, it is defined such that the eddy-current loss generated in each of the divided magnets becomes substantially equal. Such width of the permanent magnet located at a tip in a rotational direction may be made narrower than other parts.

Patent Document 4 proposes a technique for reducing an eddy-current loss during a flux weakening control in an IPM motor by narrowing a width of a permanent magnet at a rear part in a rotational direction of a rotor. In this technique, such width is defined such that the eddy-current loss at each of permanent magnet pieces becomes equal, and the eddy-current loss is calculated based on a variation range of a magnetic flux density.

CITATION LIST

Patent Document 1: Japanese Laid-Open Patent Publication JP H08-331783A
Patent Document 2: Japanese Laid-Open Patent Publication JP2000-324736A
Patent Document 3: Japanese Laid-Open Patent Publication JP2002-262490A
Patent Document 4: Japanese Laid-Open Patent Publication JP2004-096868A
Non-Patent Document 1: Technologies of high speed and high precision electromagnetic field analysis for rotating machines, Technical report of The Institute of Electrical Engineers of Japan, No. 1094, Pages 48 to 55
Non-Patent Document 2: The 2008 Annual Meeting Record I.E.E Japan, No. 5, 16 to 17 (2008)
Non-Patent Document 3: The 2008 Annual Meeting Record I.E.E Japan, No. 5, 18 to 19 (2008)

SUMMARY OF INVENTION

Technical Problem

Patent Documents 3 and 4 both define the positions to divide the magnet based on a condition of the magnetic flux density. However, especially for a rotating machine of a higher rotational speed which need has been increasing recently, there is required a method for defining such positions more effectively than the method of defining such positions based on a condition of a change of the magnetic flux density.

The problem to be solved of the present invention is to provide a permanent magnet unit in which insulating layers are located at positions where an eddy current, generated corresponding to a change in a magnetic field of the permanent magnet, can be most effectively reduced, and a method for manufacturing the permanent magnet unit in which the insulating layers are located at such positions.

Solution to Problem

Inventors of the present invention found that, by calculating a magnitude of an eddy current itself flowing inside a permanent magnet, not a parameter outside the permanent magnet such as a condition of a change of a magnet flux density, and locating insulating layers at positions defined based on such information, it is possible to largely reduce an eddy-current loss generated in a permanent magnet unit compared to prior art.

The present invention provides, in one aspect, a permanent magnet unit. The permanent magnet unit includes at least one insulating layer, and a plurality of permanent magnet pieces located adjacent to each other with the at least one insulating layer in between. The at least one insulating layer is located at positions defined based on a magnitude of an eddy current flowing inside a permanent magnet, corresponding to a change in a magnetic field of the permanent magnet into which the plurality of the permanent magnet pieces are integrally formed without the at least one insulating layer.

The magnitude of the eddy current is preferably calculated using the following formula, for any cross section $\xi$ of the permanent magnet, as a magnitude Je ($\xi$) of an eddy current in a direction vertical to the cross section $\xi$;

[Mathematical 1]

$$J_e(\xi) = \frac{1}{T}\int_T\int_S |J_S(r,t)| dS dT$$

(wherein r represents a position vector (in the following description of the present specification, r represents a position vector), t represents time, Js (r, t) represents an eddy current density vector component in a direction vertical to a cross section $\xi$ in the cross section of the permanent magnet, S represents a cross-sectional area of the cross section $\xi$ of the permanent magnet, and T represents one period of an electrical angle).

The at least one insulation layer is preferably any one of an insulating material layer and an air layer, or a combination thereof, and more preferably, any one of a layer including fluoride of a rare-earth element and a layer of an insulating resin adhesive material or a combination thereof. The permanent magnet unit is preferably a Nd—Fe—B based permanent magnet.

The present invention provides, in another aspect, a rotating machine. The rotating machine has a rotor core rotatably located inside a stator so as to be opposed to the stator through an approximately cylindrical-shaped air gap, having a central axis parallel to a rotating axis. The rotor core is formed with a plurality of slots each having a lengthwise cross section with a length direction dimension and a thickness direction dimension and extending in an axial direction, and the plurality of slots are arranged at positions spaced apart from each other in a circumferential direction of the rotor core. The permanent magnet unit according to one aspect of the present invention is located inside each of the slots.

The present invention provides, in a further aspect, a method for manufacturing a permanent magnet unit including at least one insulating layer, and a plurality of permanent magnet pieces located adjacent to each other with the at least one insulating layer in between. The method comprises steps of determining a magnitude of an eddy current flowing inside a permanent magnet, corresponding to a change in a magnetic field of the permanent magnet into which a plurality of the permanent magnet pieces are integrally formed without the at least one insulating layer, defining positions to locate the at least one insulating layer in the permanent magnet based on the determined magnitude of the eddy current, making the plurality of the permanent magnet pieces to be located adjacent to the at least one insulating layer which positions to be located are defined, and locating the made plurality of permanent magnet pieces adjacent to each other with the at least one insulating layer in between.

The step of making the plurality of the permanent magnet pieces preferably comprises making a permanent magnet into which the plurality of the permanent magnet pieces are integrally formed without the at least one insulating layer, and cutting the permanent magnet at positions defined as the positions to locate the at least one insulating layer for dividing the permanent magnet into the plurality of permanent magnet pieces. In addition, the step of locating the plurality of the permanent magnet pieces preferably comprises locating the plurality of the permanent magnet pieces such that cut faces of each of the permanent magnet pieces are opposed.

The step of determining the magnitude of the eddy current preferably comprises, for any cross section $\xi$ of the permanent magnet, calculating a magnitude Je ($\xi$) of an eddy current in a direction vertical to the cross section $\xi$ using the following formula,

[Mathematical 2]

$$J_e(\xi) = \frac{1}{T}\int_T\int_S |J_S(r,t)| dS dT$$

(wherein r represents a position vector, t represents time, Js (r, t) represents an eddy current density vector component in a direction vertical to a cross section $\xi$, in the cross section of the permanent magnet, S represents a cross-sectional area of the cross section $\xi$ of the permanent magnet, and T represents one period of an electrical angle).

According to the present invention, the permanent magnet unit is used in a rotating machine, and it is possible to locate the insulating layers at positions where a reduction effect of eddy-current loss is the largest, and not to locate the insulating layers to parts where the reduction effect of eddy-current loss is small, and thus, demagnetization can be effectively prevented without deteriorating the magnetic property of the entire permanent magnet.

BRIEF DESCRIPTION OF DRAWINGS

FIGS. 1(a)-1(d) are diagrams showing a cuboid permanent magnet unit according to one embodiment of the present invention configured such that a plurality of permanent magnet pieces are adjacent to each other with an insulating layer in between, wherein FIG. 1(a) is a permanent magnet unit in which one insulating layer is located on a cross section which is vertical to a length direction, FIG. 1(b) is a permanent magnet unit in which three insulating layers are respectively located on each of cross sections which are vertical to the length direction, FIG. 1(c) is a permanent magnet unit in which one insulating layer is located on a cross section which is vertical to a height direction, and FIG. 1(d) is a permanent magnet unit in which three insulating layers are respectively located on each of cross sections which are vertical to the height direction.

FIGS. 9(a) and 9(b) are diagrams showing a cylindrical permanent magnet unit according to another embodiment of the present invention, wherein FIG. 9(a) is a permanent magnet unit in which two insulating layers are located on a cross section positioned on a plane passing through and parallel to a central axis, and FIG. 9(b) is a permanent magnet unit in which four insulating layers are located.

FIGS. 14(a)-14(d) are schematic diagrams showing a manufacturing process of a permanent magnet or permanent magnet pieces, wherein each of steps up to green sheet formation is shown.

DESCRIPTION OF EMBODIMENTS

Figure 1:
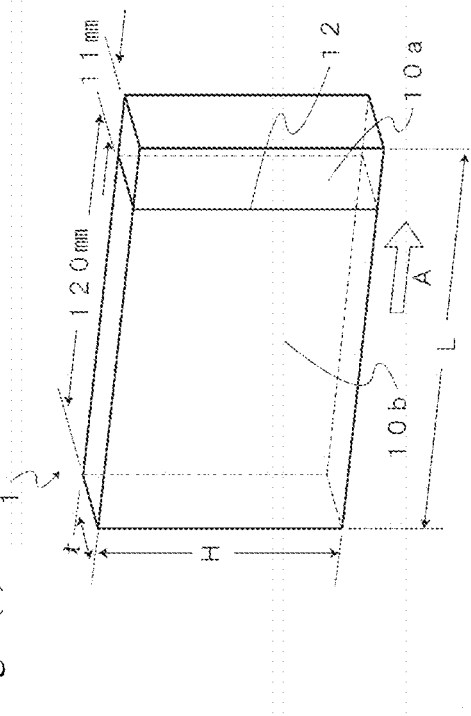
Figure 1:
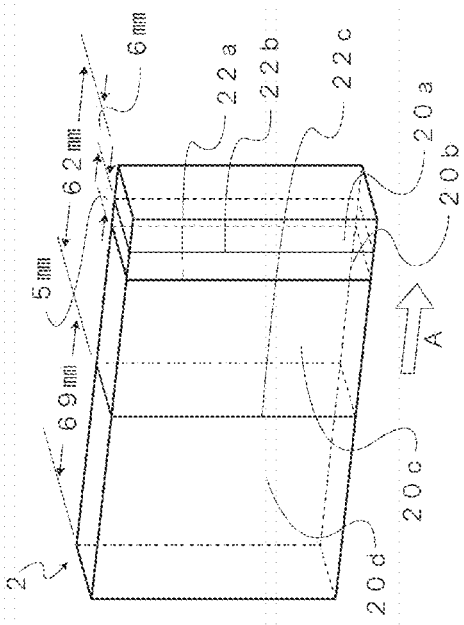
Figure 1:
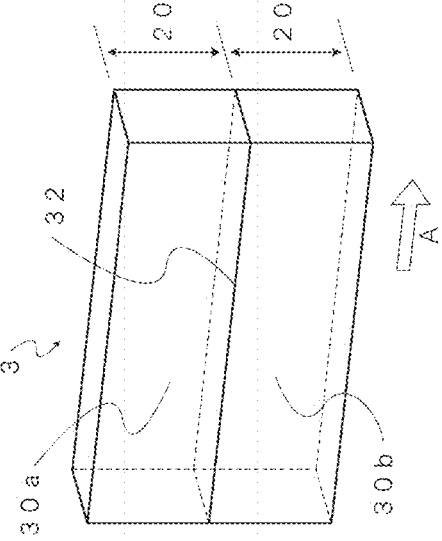
Figure 1:
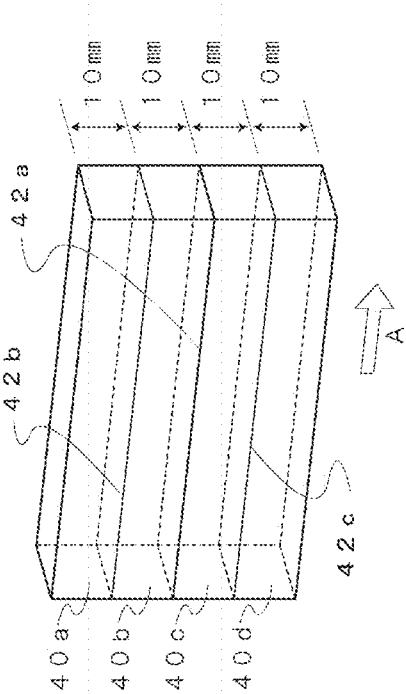

Embodiments of the present invention are described in detail in the following.

According to the invention, insulating layers in a permanent magnet unit can be located at positions most suitable for reducing an eddy current inside. In a permanent magnet unit including at least one insulating layer, and a plurality of permanent magnet pieces located adjacent to each other with at least one insulating layer in between, the at least one insulating layer is located at positions defined assuming a permanent magnet into which a plurality of the permanent magnet pieces are integrally formed without the at least one insulating layer, and more specifically, located at positions defined based on a magnitude of an eddy current flowing inside the permanent magnet, corresponding to a change in a magnetic field of the permanent magnet assumed as such.

For example, as a first embodiment, when a cuboid permanent magnet incorporated to be used in a rotor of a rotating machine is considered, in a permanent magnet unit including N−1 (N is an integer of 1 or more) insulating layers, and N permanent magnet pieces, a position to locate the next Nth insulating layer may be a position defined based on a magnitude of an eddy current flowing inside the permanent magnet, corresponding to a change in a magnetic field of the permanent magnet. By locating the Nth insulating layer at the position defined as such, the cuboid permanent magnet unit including N insulating layers, and N+1 permanent magnet pieces insulated with each other by each of the N insulating layers may be obtained.

In one embodiment, when locating a Nth insulating layer in a cuboid permanent magnet incorporated to be used in a rotor of a rotating machine, and having a length direction (x direction) dimension extending in a direction moving across a magnetic field of the rotating machine, a height direction (z direction) dimension vertical to the length direction and parallel to an axial direction of the rotating machine, and a thickness direction (y direction) dimension vertical to the length direction and the height direction, on a cross section vertical to the length direction, for example, for a cross section at a position x in the length direction, a magnitude Je (x) of an eddy current in the length direction vertical to the cross section, flowing inside, corresponding to a change in a magnetic field of the permanent magnet is calculated, and the Nth insulating layer is located at a position where Je (x) becomes in a range of values which is 95% of the maximum to the maximum. That is, by making a position in the length direction where Je (x) becomes the maximum as the center, the Nth insulating layer can be located at any position between a position corresponding to the value which is 95% of the maximum of Je (x) at one side in the length direction of the center position, and a position corresponding to the value which is 95% of the maximum of Je (x) at the other side in the length direction of the center position. Further, the permanent magnet in this embodiment has its easy magnetization axes of each of magnet particles oriented in the thickness direction (z direction), and thus, a magnetization direction C of the permanent magnet is thickness direction.

FIG. 1 (a) is a permanent magnet unit when N is 1, and shows a cuboid permanent magnet unit 1 where two permanent magnet pieces 10a and 10b are adjacently located with one insulating layer 12 in between. The permanent magnet unit 1 can be inserted in a slot 54c of an IPM (interior permanent magnet) motor 5 shown in FIG. 2. A moving direction of the permanent magnet unit 1 when it is incorporated in the IPM motor 5 is shown by an arrow A in FIG. 1. The permanent magnet unit 1 has a length direction (X direction) dimension L extending in the direction A which the permanent magnet unit 1 moves when incorporated in the IPM motor 5, a height direction (Y direction) dimension H which becomes parallel to a rotational axis 54b of the IPM motor when the permanent magnet unit 1 is incorporated, and a thickness direction (Z direction) dimension t vertical to the length direction and the height direction.

The insulating layer 12 of the permanent magnet unit 1 shown in FIG. 1 (a) is located at a front part in the moving direction of the permanent unit 1. The insulating layer 12 is located at a position defined based on a magnitude of an eddy current Je flowing inside a permanent magnet 1' into which two permanent magnet pieces 10a and 10b adjacent to each other with the insulating layer 12 in between, are integrally formed without the insulating layer 12.

Specifically, the insulating layer 12 of the permanent magnet unit 1 is located, in the permanent magnet unit 1, on a cross section vertical to the moving direction A (that is, a cross section vertical to the length direction of the permanent magnet unit 1) when the permanent magnet unit 1 is incorporated in the IPM motor 5. When the permanent magnet 1' moves within a magnetic field in a direction A shown in FIG. 1 (a), the magnitude Je (x) of the eddy current in a direction parallel to the length direction in a cross section vertical to the length direction is calculated for each of positions from a front end to a rear end in the length direction of the permanent magnet 1', and the insulating layer 12 is located at a position where Je (x) is the largest. As a result, the permanent magnet unit 1 is obtained, in which the permanent magnet piece 10a having a length L11, a height H and a thickness t, the insulating layer 12, and the permanent magnet piece 10b having a length L12 which is longer than L11, a height H and a thickness t, are adjacently located in this order in the length direction.

Thus, by locating the insulating layer 12 at the position where the magnitude of the eddy current generated inside the permanent magnet 1' is the largest such that the insulating layer 12 extends over the surface vertical to the length direction of the permanent magnet 1', and locating the permanent magnet pieces 10a and 10b of different sizes adjacent to the insulating layer 12, an eddy-current loss of the permanent magnet unit 1, formed to have a same overall shape as the permanent magnet 1', can be reduced compared to a permanent magnet in which insulating layers are located based on prior art.

The permanent magnet pieces 10a and 10b included in the permanent magnet unit 1 are preferably rare-earth permanent magnetic pieces, more preferably Nd—Fe—B based magnet or Sm—Co based magnet, and most preferably the Nd—Fe—B based magnet, but not limited thereto. In a case of the Nd—Fe—B based magnet, typically, ND-Fe—B based magnet materials include rare earth magnet (Nd, Pr, Dy, Tb) at a ratio from 27 wt % to 40 wt %, B at a ratio from 0.8 wt % to 2 wt % and Fe (electrolytic iron) at a ratio from 60 wt % to 73 wt %. In this magnet material, low amount of other elements such as Co, Cu, Al, Si, Ga, Nb, V, Mo, Zr, Ta, Ti, W, Ag, Bi, Zn, Mg may be included with a view to improve a magnetic property.

The insulating layer 12 included in the permanent magnet unit 1 may be any layer as long as which can effectively insulate the permanent magnet piece 10a and the permanent magnet piece 10b being adjacent with the insulating layer 12 in between, and is preferably a layer including an insulating material or an air layer. As the insulating material, for example, an epoxy adhesive, plastic, a heat-shrinkable film, ceramic etc. may be used. For an insulating layer having ceramics as its material, a layer including fluoride of a rare-earth element including yttrium is preferably used.

Figure 2:
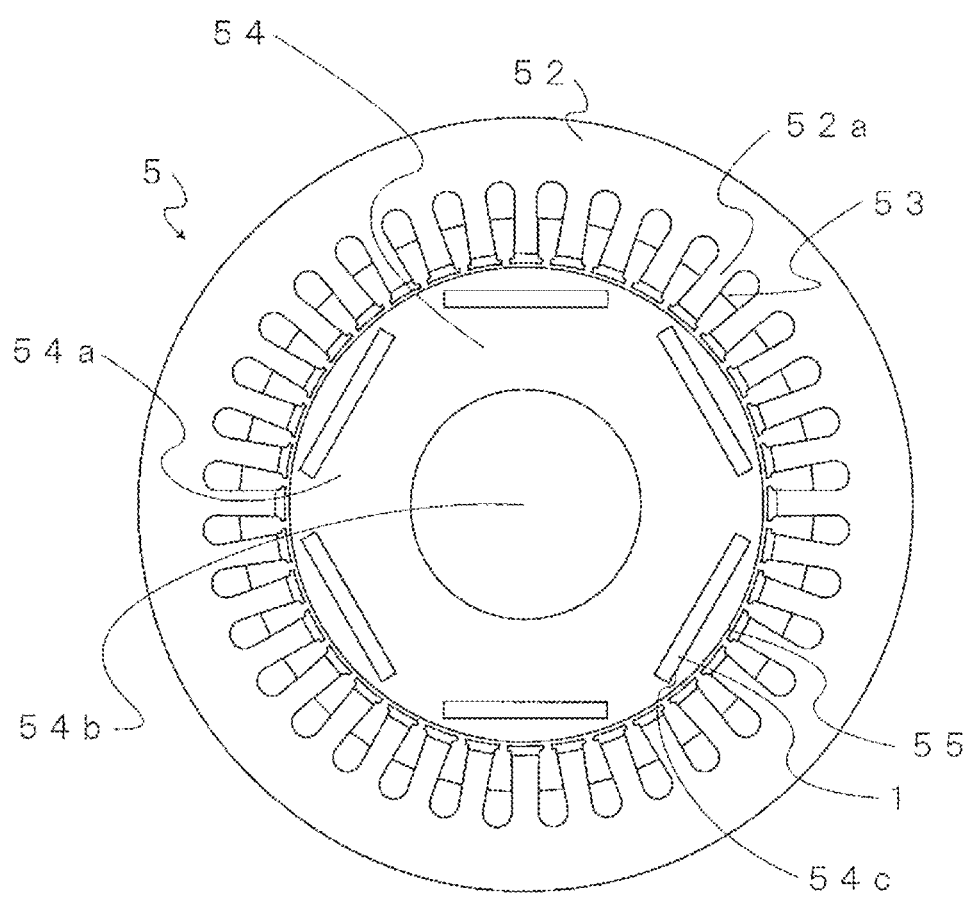
FIG. 2 is an example of an interior permanent magnet (IPM) motor in which the permanent magnet unit shown in FIG. 1(a) is used.

FIG. 2 shows an example of an IPM motor in which the permanent magnet 1 shown in FIG. 1 (a) is embedded. The IPM motor 5 includes a stator 52 which is a non-movable portion and a rotor 54 which is a movable portion, as shown in FIG. 2. The stator 52 includes a plurality of circumferentially spaced teeth 52a, and a magnetic coil 53 is wound around the respective teeth 52a. When the magnetic coil 53 is energized, a rotating magnetic field for rotating the rotor 54 is generated. The rotor 54 is rotatably located inside the stator 52 such that its periphery opposes the stator through an air gap 55. The air gap 55 may be formed between an end face of each of the teeth 52a of the stator 52 and the periphery of the rotor 54. The rotor 54 has a rotor core 54a, a shaft 54b coupled to the rotor core 54a, and a plurality of permanent magnet units 1 located outside of the shaft 54b inside the rotor core 54a. Each of a plurality of the permanent magnet units 1 is inserted in each of a plurality of slots for inserting magnet 54c formed in the rotor core 54a such that the height direction of the permanent magnet unit 1 is directed to a direction vertical to a plane of paper of FIG. 2.

Here, a method for defining positions to locate the insulating layers of the present invention is described, making the permanent magnet unit 1 of FIG. 1 (a) as an example. The position to locate the insulating layer 12 is defined assuming the permanent magnet 1' into which two permanent magnet pieces 10a and 10b, adjacent to each other with the insulating layer 12 in between, are integrally formed without the insulating layer 12. In the permanent magnet unit 1, when the permanent magnet 1' into which two permanent magnet pieces 10a and 10b are integrally formed without the insulating layer 12 moves within a magnetic field in a direction A, the magnitude Je (x) of the eddy current in a direction parallel to the length direction in a cross section vertical to the length direction is calculated for each of the positions from the front end to the rear end in the length direction of the permanent magnet 1', and the insulating layer 12 is located at a position in the length direction where the magnitude Je (x) of the eddy current is the largest. Je (x) is calculated, using the following Formula (1), as the magnitude of the eddy current generated inside the permanent magnet 1' when this neodymium permanent magnet 1' is inserted in the IPM motor 5 having a structure shown for example in FIG. 2;

[Mathematical 3]

$$J_e(x) = \frac{1}{T} \int_T \int_S |J_x(r, t)| dS dT \quad (1)$$

wherein r is a position vector (r=(x, y, z), t is time, x is a position in the length direction of the permanent magnet 1', Jx (r, t) is an eddy current density vector component in the length direction at a position x of the permanent magnet 1', S is a cross-sectional area at the position x of the permanent magnet 1' and T is one period of an electrical angle.

Figure 3:
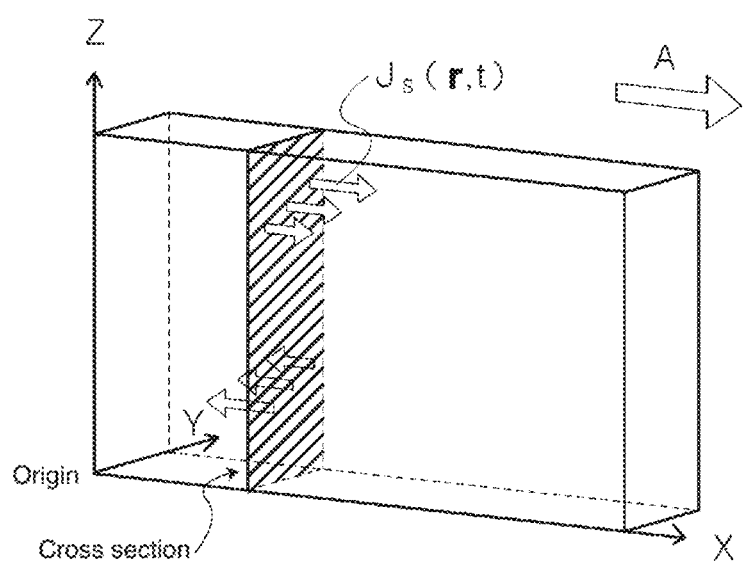
FIG. 3 shows an image of an eddy current density vector in a direction vertical to a cross section in any cross section of a cuboid permanent magnet.

FIG. 3 shows an image of an eddy current density vector in a length direction vertical to a cross section ξ in any cross section ξ. When the above Formula (1) is generalized, a magnitude Je (ξ) of the eddy current in a direction vertical to any cross section ξ may be represented as in the following Formula (2);

[Mathematical 4]

$$J_e(\xi) = \frac{1}{T} \int_T \int_S |J_S(r, t)| dS dT \quad (2)$$

wherein r is a position vector (r=(x, y, z), t is time, Js (r, t) represents an eddy current density vector component in a direction vertical to a cross section in any cross section ξ, S represents a cross-sectional area of the cross section ξ and T represents one period of an electrical angle.

Further, when defining positions to locate insulating layers in permanent magnet units 3 and 4 described later which are other examples of the permanent magnet units, for each of the positions from a front end to a rear end in the height direction of the permanent magnet, a magnitude Je (z) of an eddy current in a direction parallel to the height direction in a cross section vertical to the height direction is used, and the magnitude of Je (z) is calculated using the following Formula (3);

[Mathematical 5]

$$J_e(z) = \frac{1}{T} \int_T \int_S |J_z(r,t)| dSdT \quad (3)$$

wherein r is a position vector (r=(x, y, z), t is time, z is a position in the height direction of the permanent magnet, Jz (r, t) is an eddy current density vector component in the height direction at the position z of the permanent magnet, S is a cross-sectional area at the position z of the permanent magnet and T is one period of an electrical angle.

In the example of FIG. 1 (a), a neodymium magnet having a length L of 131 mm, a height H of 40 mm and a thickness t of 14.2 mm is used as the permanent magnet 1' into which two permanent magnet pieces 10a and 10b, being adjacent with the insulating layer 12 in between, are formed without the insulating layer 12. A x direction component Jx (r, t) of the eddy current density vector in Formula (1) is an eddy current density vector Je (r, t) obtained by applying this permanent magnet 1' as a magnet of an IPM motor benchmark model described in Non-Patent Document 1 and performing an electromagnetic field numerical analysis using a finite element method.

Figure 4:
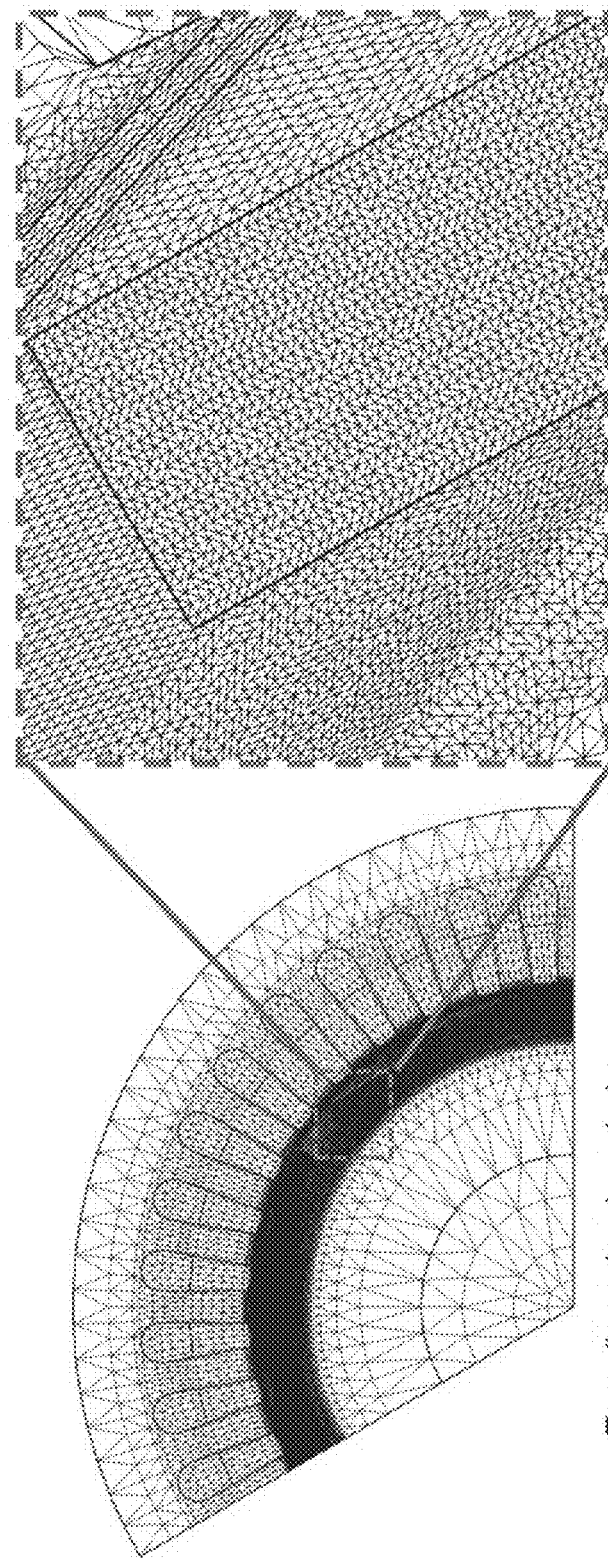
FIG. 4 is a diagram showing a shape of an element used in an electromagnetic field numerical analysis in an embodiment of the present invention, wherein the left shows a diagram of two-dimensional mesh data in an analysis model, and the right shows a diagram of an enlarged magnet and a surrounding part thereof.

Conditions used for the electromagnetic field numerical analysis in the present embodiment are as in the following.
Number of elements: 3,406,590
Number of sides: 4,133,733
Number of unknowns: 3,820,001
Number of node points: 620,988
Calculating method: A–φ method
Type of elements: Tetrahedron side elements Further, among the above conditions, when the number of elements is larger, the magnitude of the eddy current can be determined more accurately, and the number of elements is preferably 3 million or more. FIG. 4 shows a shape of an element used in the electromagnetic field numerical analysis. The left side of FIG. 4 shows a two-dimensional mesh data in an analysis model, and the right side shows a diagram of an enlarged magnet and a surrounding part thereof.

Figure 5:
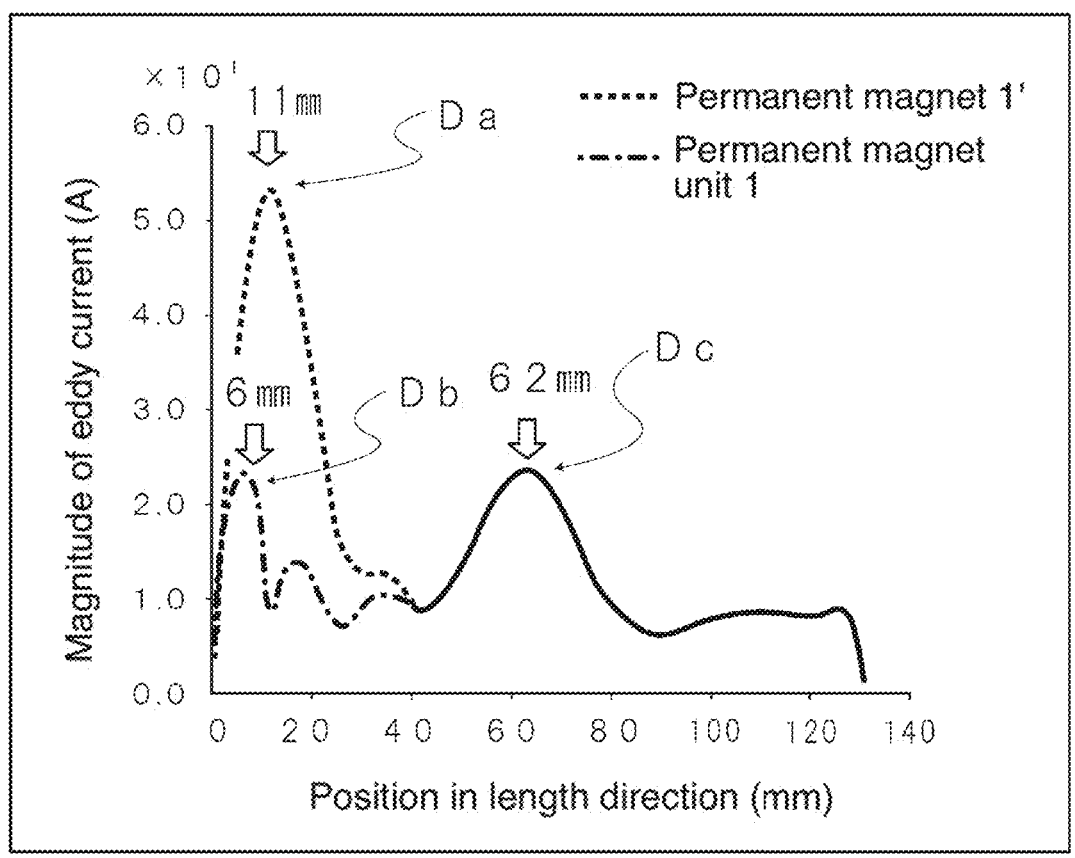
FIG. 5 is a diagram showing a calculation result of a magnitude Je (x) of an eddy current according to one embodiment of the present invention.

FIG. 5 shows the magnitude Je (x) of the eddy current flowing inside the permanent magnet 1' calculated as such. FIG. 5 plots the length (mm) from the front end to the rear end in the moving direction as a horizontal axis, and the magnitude Je (x) (A) of the eddy current at respective positions in the length direction as a vertical axis. The magnitude Je (x) of the eddy current flowing inside the permanent magnet 1' is shown by a dotted line and a following solid line. In the permanent magnet 1', it is found that the magnitude Je (x) of the eddy current is the largest at a position Da which is 11 mm, and the second largest at a position which is 62 mm, from the front end in the length direction. Therefore, when locating one insulating layer in the permanent magnet unit 1, the insulating layer 12 may be located at the position Da where the magnitude Je (x) of the eddy current is the largest. That is, the permanent magnet unit 1 is configured by the permanent magnet piece 10a having a height of 40 mm, a thickness of 14.2 mm and a length of 11 mm, and the permanent magnet piece 10b having a height of 40 mm, a thickness of 14.2 mm and a length of 120 mm, being adjacent in the length direction with the insulating layer 12 in between.

Further, in this example, the insulating layer is located only at the position Da where the magnitude Je (x) of the eddy current is the largest, but the second insulating layer may also be located at the position where the magnitude of the eddy current is the second-largest, which is 62 mm from the front end in the length direction (that is, a position Dc shown in FIG. 5), to form a permanent magnet unit in which two insulating layers and three permanent magnet pieces are alternatively adjacent to each other.

In addition, another example of a permanent magnet according to the present invention is shown in FIG. 1 (b).

FIG. 1 (b) is a permanent magnet unit when N is 3, and shows a cuboid permanent magnet unit 2 in which four permanent magnet pieces 20a, 20b, 20c and 20d are adjacently located with three insulating layers 22a, 22b and 22c in between. A moving direction of the permanent magnet unit 2 when it is incorporated in the IPM motor 5 is shown by an arrow A in FIG. 1 (b). The overall shape of the permanent magnet unit 2 is the same as the permanent magnet unit 1.

The insulating layer 22a of the permanent magnet unit 2 is located at a position defined based on a result calculated by the method and conditions same as the permanent magnet unit 1 described in the above. In addition, the insulating layers 22b and 22c are located at positions defined by calculating a magnitude of an eddy current flowing inside a permanent magnet having the insulating layer 22a, that is, a permanent magnet 2' having the same configuration as the permanent magnet unit 1, and based on the calculation result thereof. Specifically, the insulating layers 22b and 22c are located at two positions; a position where Je (x), calculated as a magnitude of the eddy current in a direction parallel to the length direction in a cross section vertical to the length direction, is the largest, and a position where Je (x) is the second-largest, for each of positions from a front end to a rear end in the length direction of the permanent magnet 2', when the permanent magnet 2' is incorporated in the IPM motor 5 and moves within a magnetic field in a direction A.

For example, in a case where a neodymium permanent magnet having a length L of 131 mm, a height H of 40 mm and a thickness t of 14.2 mm is used as the permanent magnet 2', the magnitude Je (x) of the eddy current calculated by Formula (1) is shown by alternate long and short dashed line and the following solid line in FIG. 5. The insulating layers 22b, 22a and 22c in the permanent magnet unit 2 are located at each of positions corresponding to positions of the magnitude of the eddy current, Da, Db and Dc in FIG. 5. Therefore, in the permanent magnet unit 2, the insulating layer 22a is located at a position 6 mm from the front end in the length direction, the insulating layer 22b is located at a position 11 mm from the front end in the length direction and the insulating layer 23c is located at a position 62 mm from the front end in the length direction. That is, the permanent magnet unit 2 is configured by the permanent magnet piece 20a having a height of 40 mm, a thickness of 14.2 mm and a length of 6 mm, the permanent magnet piece 20b having the same height and thickness as the permanent magnet piece 20a and a length of 5 mm, the permanent magnet piece 20c having the same height and thickness as the permanent magnet piece 20*a* and a length of 51 mm, and the permanent magnet piece 20*d* having the same height and thickness as the permanent magnet piece 20*a* and a length of 69 mm, being adjacent with the insulating layers 22*a*, 22*b* and 22*c* respectively in between.

Further, also in this example, a fourth insulating layer may be located also at a crest position to the right of Db in FIG. 5 (a position at 20 mm) to form a permanent magnet unit in which four insulating layers and five permanent magnet pieces are alternatively adjacent to each other.

In another embodiment, when locating the Nth insulating layer in a permanent magnet located in a rotor of a rotating machine, and having a length direction (x direction) dimension extending in a direction moving across a magnetic field of the rotating machine, a height direction (z direction) dimension vertical to the length direction and parallel to an axial direction, and a thickness direction (y direction) dimension vertical to the length direction and the height direction, on a cross section vertical to the height direction, a magnitude Je (z) of an eddy current in the height direction flowing inside the permanent magnet is calculated by using Formula (2), and the Nth insulating layer is located at a position where Je (x) becomes the largest.

FIG. 1(*c*) is a permanent magnet unit when N is 1, and shows a permanent magnet unit 3 in which two permanent magnet pieces 30*a* and 30*b* are adjacently located with one insulating layer 32 in between. A moving direction of the permanent magnet unit 3 when it is incorporated in the IPM motor 5 is shown by an arrow A, and the overall shape of the permanent magnet unit 3 is the same as the permanent magnet unit 1.

The insulating layer 32 of the permanent magnet unit 3 is located at a center part in the height direction of the permanent unit 3. The insulating layer 32 is located at a position defined based on a magnitude Je (z) of an eddy current flowing inside a permanent magnet 3' into which two permanent magnet pieces 30*a* and 30*b* are adjacent to each other with the insulating layer 32 in between, are integrally formed without the insulating layer 32.

Specifically, the insulating layer 32 of the permanent magnet unit 3 is located, in the permanent magnet unit 3, on a cross section vertical to an axis 54*b* direction (that is, the height direction of the permanent magnet unit 3) of the IPM motor 5 when the permanent magnet unit 3 is incorporated in the IPM motor 5. When the permanent magnet 3' moves within a magnetic field in a direction A shown in FIG. 1 (*c*), the insulating layer 32 is located at a position where, for each of positions from an upper end to a lower end in the height direction of the permanent magnet 3', Je (z) calculated as a magnitude of the eddy current in a direction parallel to the height direction in a cross section vertical to the height direction is the largest.

Figure 6:
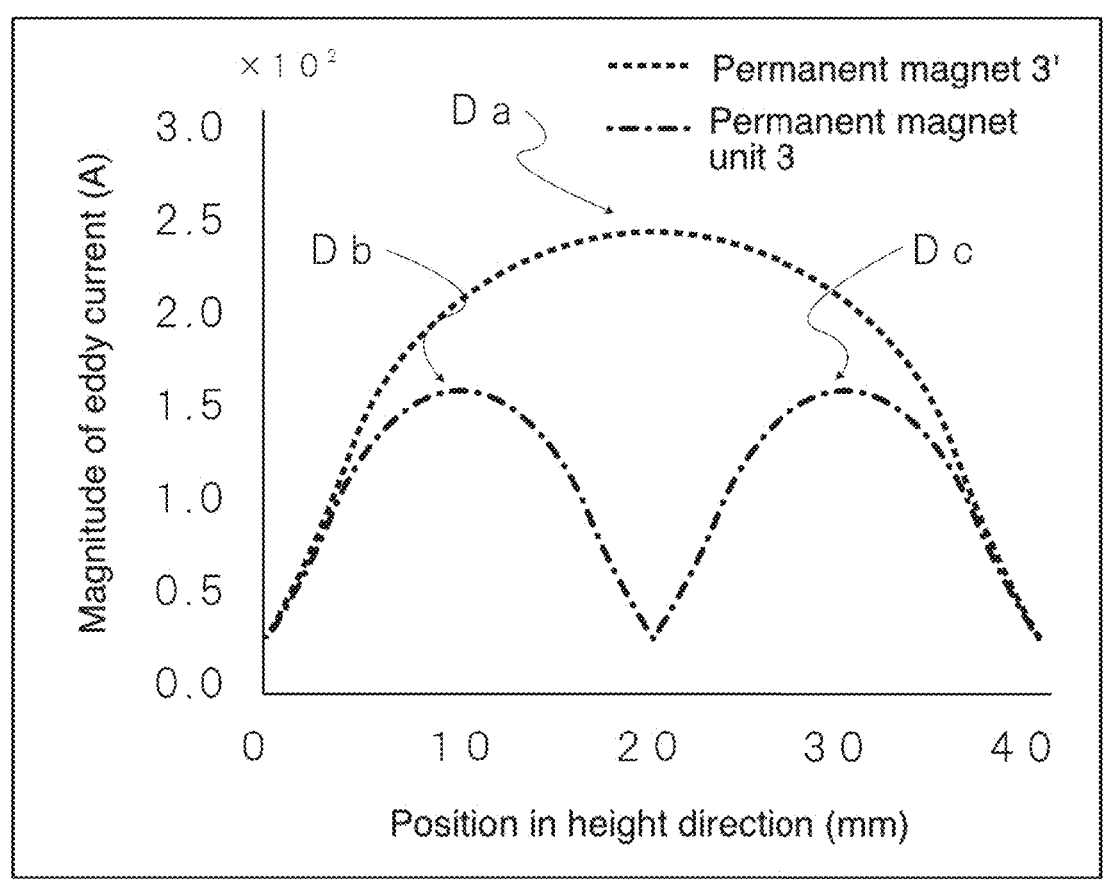
FIG. 6 is a diagram showing a calculation result of a magnitude Je (z) of an eddy current according to another embodiment of the present invention.

For example, in a case where a neodymium permanent magnet having a length L of 131 mm, a height H of 40 mm and a thickness t of 14.2 mm is used as the permanent magnet 3', the magnitude Je (z) of the eddy current calculated by Formula (2) is shown by a dotted line in FIG. 6. The method and conditions for calculating the magnitude Je (z) of the eddy current is the same as the case where the magnitude Je (z) of the eddy current is calculated in the above. FIG. 6 plots the length (mm) from the upper end to the lower end of the permanent magnet 3' in the height direction as a horizontal axis, and the magnitude Je (z) of the eddy current at respective positions in the height direction as a vertical axis. In the permanent magnet 3', it is found that the magnitude Je (z) of the eddy current is the largest at a position Da which is 20 mm from the front end in the length direction. Therefore, in the permanent magnet unit 3, the insulating layer 32 may be located at the position Da where the eddy current Je (z) is the largest. That is, the permanent magnet unit 3 is configured by the permanent magnet piece 30*a* having a height of 20 mm, a thickness of 14.2 mm and a length of 131 mm, and the permanent magnet piece 30*b* having a height of 20 mm, a thickness of 14.2 mm and a length of 131 mm, being adjacent in the height direction with the insulating layer 32 in between.

FIG. 1 (*d*) is a permanent magnet unit when N is 3, and shows a cuboid permanent magnet unit 4 in which four permanent magnet pieces 40*a*, 40*b*, 40*c* and 40*d* are adjacently located with three insulating layers 42*a*, 42*b* and 42*c* in between. A moving direction of the permanent magnet unit 4 when the permanent magnet unit 4 is incorporated in the IPM motor 5 is shown by an arrow A. The overall shape of the permanent magnet unit 4 is the same as the permanent magnet unit 1.

The insulating layer 42*a* of the permanent magnet unit 4 is located at a position defined based on a result calculated by the method and conditions same as the permanent magnet unit 3 described in the above. In addition, the insulating layers 42*b* and 42*c* are located at positions defined by calculating a magnitude of an eddy current flowing inside a permanent magnet which has the insulating layer 42*a*, that is, a permanent magnet 4' having the same configuration as the permanent magnet unit 3, and based on the calculation result thereof. Specifically, the insulating layers 42*b* and 42*c* are located at two positions where Je (x), calculated as a magnitude of the eddy current in a direction parallel to the height direction in a cross section vertical to the height direction, is the largest, for each of positions from the upper end to the lower end in the height direction of the permanent magnet 4', when the permanent magnet 4' is incorporated in the IPM motor 5 and moves within in a magnetic field in a direction A.

For example, in a case where a neodymium permanent magnet having a length L of 131 mm, a height H of 40 mm and a thickness t of 14.2 mm is used as the permanent magnet 4', the magnitude Je (z) of the eddy current calculated by Formula (2) is shown by alternate long and short dashed line in FIG. 6. Positions of the insulating layers 42*b*, 42*a* and 42*c* in the permanent magnet unit 4 each corresponds to positions of the magnitude of the eddy current, Db, Da and Dc in FIG. 6. In the permanent magnet unit 4, the insulating layers 42*b*, 42*a* and 42*c* are respectively located at positions 10 mm, 20 mm and 30 mm from the upper end in the height direction. That is, the permanent magnet unit 4 is configured by the permanent magnet pieces 40*a*, 40*b*, 40*c* and 40*d* having a height of 10 mm, a thickness of 14.2 mm and a length of 131 mm, being adjacent in the height direction, with the insulating layers 42*a*, 42*b* and 42*c* respectively in between.

For the permanent magnet units 1 to 4 where positions to locate the insulating layers are defined as described in the above and having them located, and the permanent magnet having no insulating layer located, the maximum value of the magnitude of the eddy current, the position where the maximum value of the magnitude of the eddy current has generated, eddy-current loss and a rate of reduction of eddy-current loss are summarized as in the following Table 1.

TABLE 1

| | Maximum value of magnitude of eddy current (A) | Position where maximum value of magnitude of eddy current generated | Eddy-current loss (W) | Rate of reduction of eddy-current loss (%) |
|---|---|---|---|---|
| Without insulating layer | (x direction) $5.46 \times 10^1$ (z direction) $2.47 \times 10^2$ | 11 mm from front end 20 mm from upper end | 375 | — |
| Permanent magnet unit 1 (Example 1) | $2.40 \times 10^1$ | 6 mm, 62 mm from front end | 269 | 28 |
| Permanent magnet unit 2 (Example 2) | — | — | 214 | 43 |
| Permanent magnet unit 3 (Example 3) | $1.64 \times 10^2$ | 10 mm, 30 mm from upper end | 257 | 31 |
| Permanent magnet unit 4 (Example 4) | — | — | 136 | 64 |

For each of the permanent magnets and permanent magnet units in Table 1, the eddy-current loss $W_{ed}$ is determined by a finite element method using the following Formula (4);

[Mathematical 6]

$$W_{ed} = \frac{1}{T}\int_{t}^{t+T}\left(\int_{V_{mag}}\frac{|Je|^2}{\sigma}dv\right)dt \tag{4}$$

wherein T is one period of an electrical angle, Vmag is a volume of a permanent magnet or permanent magnet unit and σ is electric conductivity of a permanent magnet piece. In addition, an eddy current density vector Je is an eddy current density vector flowing in each of barycenters of finite elements when the permanent magnet or permanent magnet unit is applied as a magnet of the IPM benchmark model described in Non-Patent Document to perform the electromagnetic field numerical analysis using the finite element method. Conditions of the electromagnetic field numerical analysis performed here is the same as the conditions when the magnitude of the eddy current flowing inside the permanent magnet 1' is calculated.

Next, in order to confirm the reduction effect of the eddy-current loss, a permanent magnet unit in which insulating layers are located by the method for defining positions to locate insulating layers according to the present invention, and a permanent magnet unit in which insulating layers are located according to prior art are compared. The comparison was performed between the permanent magnet unit 1 according to the present invention, and a permanent magnet unit in which insulating layers are located at positions defined according to prior art in the permanent magnet 1' used for defining the positions for locating the insulating layers in the permanent magnet unit 1. The permanent magnet 1' is a neodymium magnet having a length L of 131 mm, a height H of 40 mm and a thickness t of 14.2 mm. The insulating layers defined according to prior art are located on a cross section which is vertical to the moving direction, similar as in the case of the permanent magnet unit 1. The positions of the insulating layers according to prior art are defined using the method for defining positions to locate insulating layers described in Patent Documents 3 and 4.

The method described in Patent Document 3 is a method for defining width of each of permanent magnet pieces included in a permanent magnet unit corresponding to a proportion of change of magnetic flux density at each of positions of the permanent magnet when the permanent magnet unit crosses a magnetic field. As formulas for determining the proportion of change of magnetic flux density, the following two calculation formulas (5) and (6) are used. Formula (5) determines an average value of the magnetic flux density at any position in the length direction (any cross-section vertical to the length direction) of the permanent magnet unit, and Formula 6 determines an average value of time change of the magnetic flux density at any position in the length direction of the permanent magnet unit;

[Mathematical 7]

$$B_y^{ave}(r) = \frac{1}{T}\frac{1}{S}\int_T\int_S B_y(r,t)dSdT \tag{5}$$

[Mathmatical 8]

$$\Delta B_y^{ave}(r) = \frac{1}{T}\frac{1}{S}\int_T\int_S\left|\frac{dB_y(r,t)}{dt}\right|dSdT \tag{6}$$

wherein r is a position vector (r=(x, y, z), t is time, T is one period of an electrical angle, S is a cross-sectional area vertical to the length direction, and $B_y$ (r, t) is a magnetic density component generated in the thickness direction (y direction) of the permanent magnet thereon when an electric motor is driven.

Figure 7:
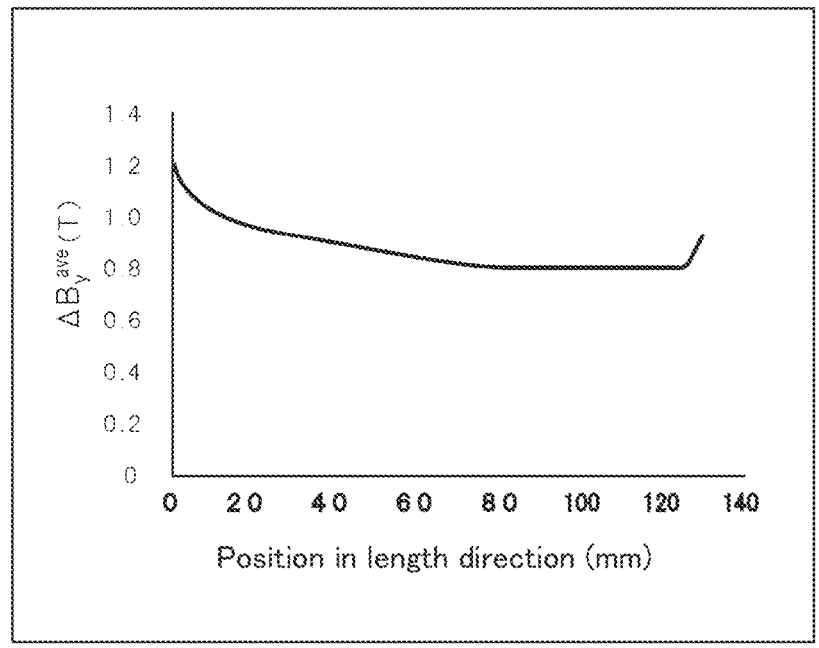
FIGS. 7(a) and 7(b) are diagrams showing a proportion of change of a magnetic flux density for defining positions to locate insulating layers according to prior art.
Figure 7:
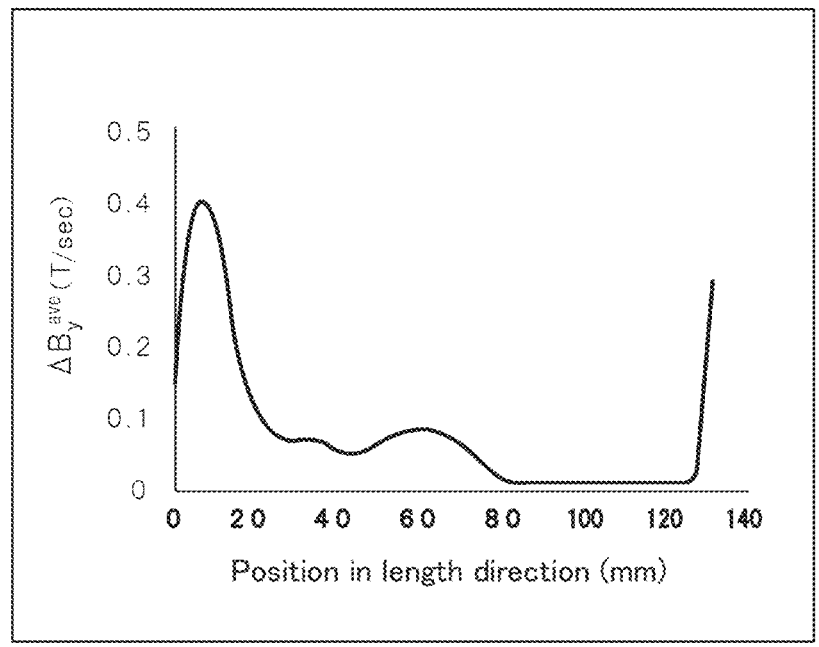

Values calculated by Formulas (5) and (6) are respectively plotted in FIGS. 7 (*a*) and 7 (*b*), wherein the length direction of the permanent magnet unit is made as the horizontal axis. Based on these calculation results, as in the case of the permanent magnet unit 1, the positions to locate one insulating layer are made as the positions where each proportion of change of magnetic flux density of permanent magnet pieces being adjacent with the insulating layer in between becomes equal. As a result, when calculated by Formula (5), the insulating layer may be located at a position 60 mm from the front end in the moving direction, and when calculated by Formula (6), the insulating layer may be located at a position 20 mm from the front end in the moving direction. The permanent magnets, in which the positions of the insulating layers are defined as such, are made as Comparative Examples 1 and 2, respectively.

The method described in Patent Document 4 is a method for defining width of each of permanent magnet pieces included in a permanent magnet unit such that an eddy-current loss generated in the permanent magnet pieces when the permanent magnet unit crosses a magnetic field become substantially equal. The eddy-current loss Wloss is assumed to be proportional to a proportion of change of a square of magnetic flux density B (x), and is determined by the following Formula (7).

[Mathematical 9]

$$W_{loss} = a \times \int B(x)^2 dx \tag{7}$$

Figure 8:
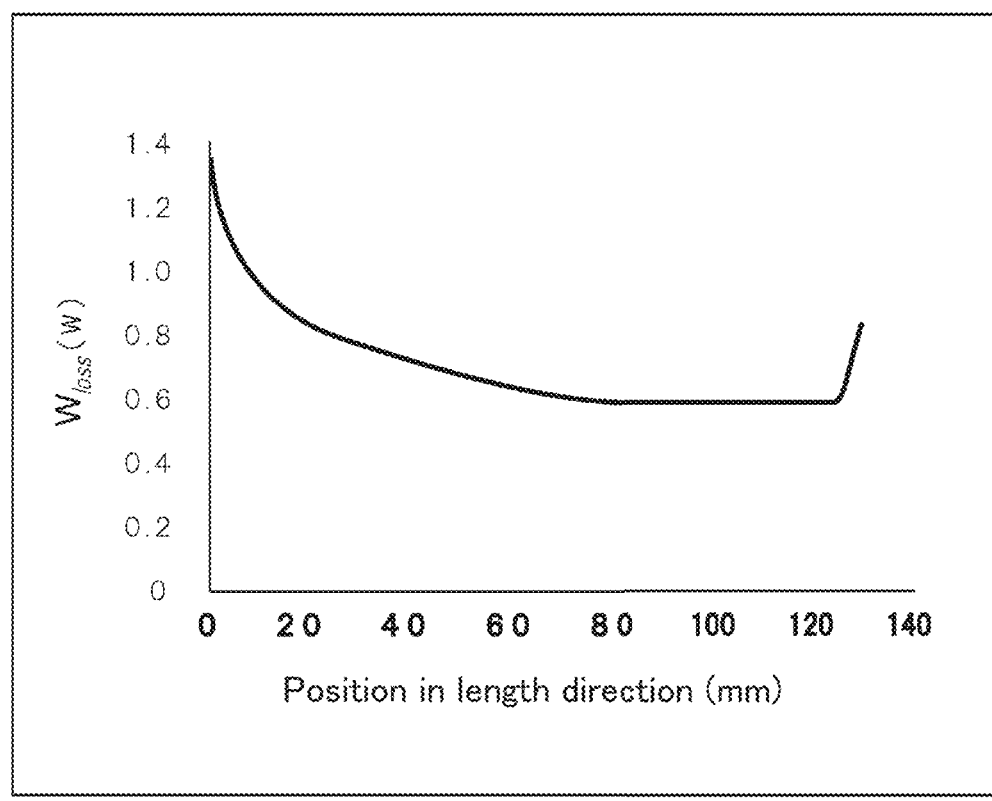
FIG. 8 is a diagram showing a change of eddy-current loss for defining positions to locate insulating layers according to prior art.

Values calculated by Formula (7) are plotted in FIG. 8, wherein the length direction of the permanent magnet unit is made as the horizontal axis. Based on this calculation result, as in the case of the permanent magnet unit 1, the position to locate one insulating layer is made as a position where the eddy-current loss generated in the permanent magnet pieces being adjacent with the insulating layer in between, that is, a proportion of change of a square of the magnetic flux density becomes equal. As a result, when calculated by Formula (7), the insulating layer may be located at a position 55 mm from the front end in the moving direction. The permanent magnet in which the position of the insulating layer is defined as such is made as Comparative Example 3.

Further, with respect to Comparative Examples 1 to 3, none of Patent Documents describe specific positions to locate the insulating layers. Therefore, the positions to locate the insulating layers in Comparative Examples 1 to 3 are made as positions where, when a curve line is divided in two, the divided areas of the lower region of a curve line (areas surrounded by the curve line, the vertical axis and the horizontal axis) of respective curve lines become equal, in FIG. 7 (a), FIG. 7 (b) and FIG. 8.

The above is summarized in Table 2-. From Table 2, when the permanent magnet unit and the method for defining positions to locate insulating layers according to the present invention are used, it is found that it is possible to define the positions to locate the insulating layers such that the eddy-current loss of the entire permanent magnet unit is reduced largely, compared to prior art.

TABLE 2

| | Method for defining positions to locate insulating layers | Position to locate insulating layer | Eddy-current loss | Rate of reduction of eddy-current loss |
|---|---|---|---|---|
| Without insulating layer | — | — | 375 W | — |
| Example 1 (Permanent magnet unit 1) | Magnitude of eddy current | 11 mm from front end in length direction | 269 W | 28% |
| Comparative Example 1 | Average value of magnetic flux density | 60 mm from front end in length direction | 359 W | 4.3% |
| Comparative Example 2 | Average value of time changes of magnetic flux density | 20 mm from front end in length direction | 352 W | 6.1% |
| Comparative Example 3 | Proportion of change of square of magnetic flux density | 54 mm from front end in length direction | 364 W | 2.9% |

As a second embodiment, when a cylindrical permanent magnet which can be located to be used on a shaft surface of a rotating machine is considered, positions of the first two insulating layers to be located on a cross section positioned on a plane parallel to a central axis, in a permanent magnet integrally formed without an insulating layer, for example, may be positions defined based on a magnitude of an eddy current flowing inside the permanent magnet corresponding to a change in a magnetic field of the permanent magnet. In addition, in a cylindrical permanent magnet unit including M (M is 2 or more) insulating layers located on a cross section positioned on a plane parallel to a central axis, and M permanent magnet pieces located adjacent to each other with the M insulating layers in between, the position for the (M+1)th insulating layer to be located next may be a position defined based on a magnitude of an eddy current flowing inside the permanent magnet unit corresponding to a change in a magnetic field of the permanent magnet unit. By locating the insulating layers at positions defined as such, the cylindrical permanent magnet unit including M insulating layers, and M permanent magnet pieces insulated from each other by each of the M insulating layers may be obtained.

In one embodiment, when locating first two insulating layers in a cylindrical permanent magnet located to be used on a shaft surface of a rotating machine, and having a circumferential direction ($\theta$ direction), a radial direction (R direction) and a height direction (z direction) parallel to a central axis of the rotating machine, for example on a cross section positioned on a plane passing through and parallel to the central axis, for each of cross sections from mechanical angles $\theta=0°$ to $\theta=360°$, a magnitude Je ($\theta$) of an eddy current in the circumferential direction vertical to the cross section, flowing inside, corresponding to a change in a magnetic field of the permanent magnet is calculated, and the first two insulating layers are located at circumferential positions where a value of Je ($\theta$) becomes the maximum, or vicinity of the maximum, for example at circumferential positions where Je ($\theta$) is in a range of values from 95% of the maximum to the maximum.

Figure 9:
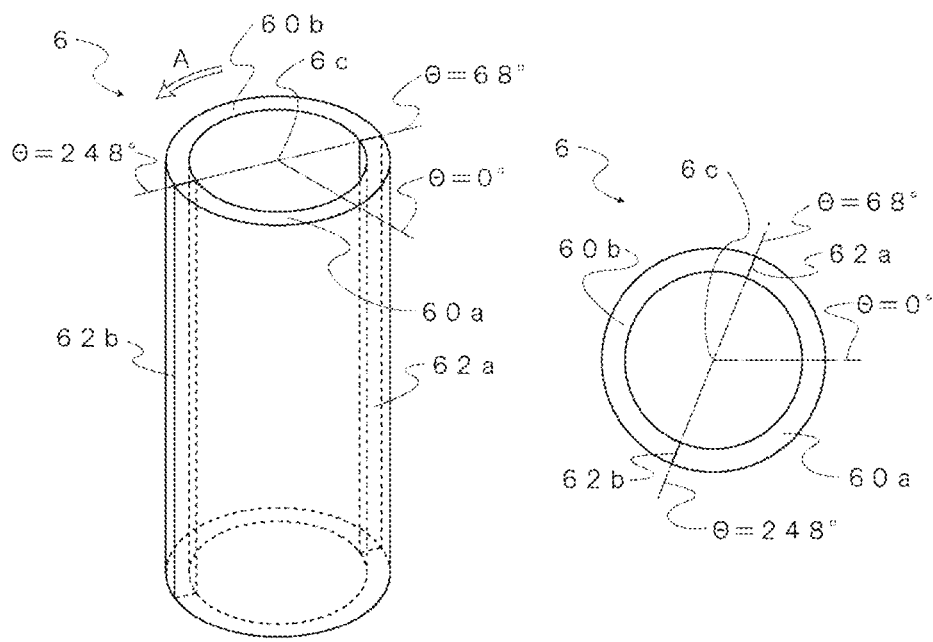
Figure 9:
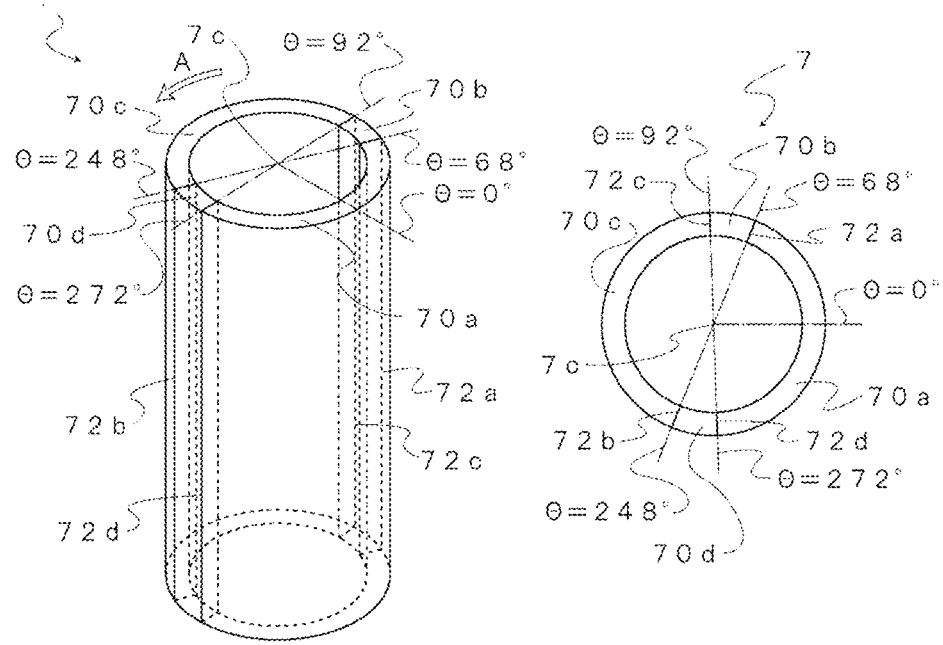

FIG. 9 (a) is a permanent magnet unit in which two insulating layers are located, and shows a cylindrical permanent magnet unit 6 in which two permanent magnet pieces 60a and 60b are adjacently located with two insulating layers 62a and 62b in between. The permanent magnet unit 6 may be located on a surface of a shaft 85 of a SPM (surface permanent magnet) motor 8 shown in FIG. 10. The permanent magnet unit 6 rotates in a direction of an arrow A of FIG. 9 around a central axis 6c when incorporated in the SPM motor 8.

The insulating layers 62a and 62b of the permanent magnet unit 6 shown in FIG. 9 (a) are located on a plane passing through and parallel to the central axis 6c of the permanent magnet unit 6. The insulating layers 62a and 62b are located at positions defined based on a magnitude of an eddy current Je flowing inside a permanent magnet 6' into which two permanent magnet pieces 60a and 60b are integrally formed without the insulating layers 62a and 62b.

Figure 10:
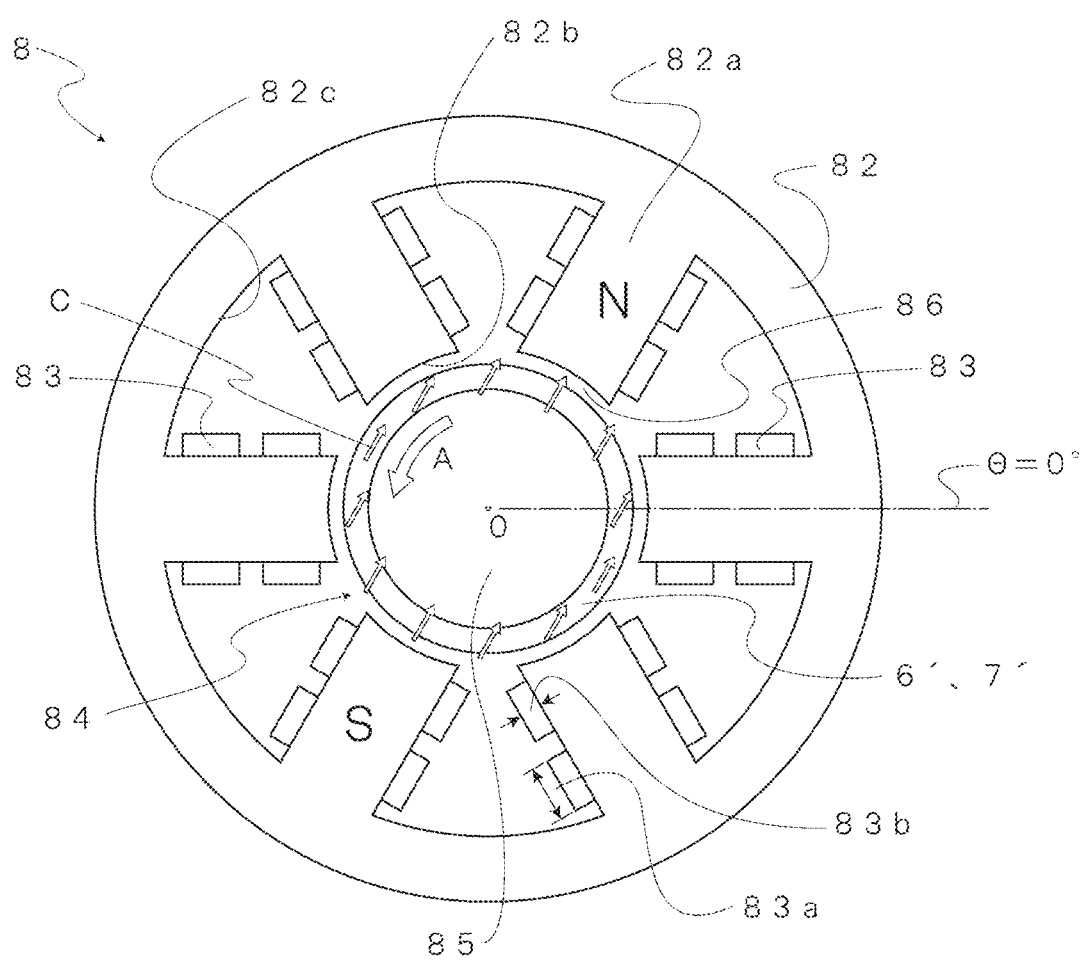
FIG. 10 is a diagram showing a surface permanent magnet (SPM) motor in which the permanent magnet unit shown in FIG. 9(a) or 9(b) is used.

Specifically, the insulating layers 62a and 62b of the permanent magnet unit 6 are located on a cross section at positions where mechanical angles are $\theta=68°$ and $\theta=248°$ when the permanent magnet unit 6 is incorporated in the SPM motor 8 as shown in FIG. 10. When the permanent magnet 6' without any insulating layer is incorporated in the SPM motor shown in FIG. 10 and rotated in the direction A, on each of cross sections positioned on a plane passing through and parallel to a central axis of the permanent magnet 6', the magnitude Je ($\theta$) of the eddy current in the circumferential direction vertical to the cross section is calculated, and the insulating layers 62a and 62b are located at two positions where Je ($\theta$) is the largest.

In addition, FIG. 9 (b) is a permanent magnet unit in which four insulating layers are located, and shows a cylindrical permanent magnet unit 7 in which four permanent magnet pieces 70a, 70b, 70c and 70d are adjacently located with four insulating layers 72a, 72b, 72c and 72d in between. The permanent magnet unit 7 may be located on a surface of the shaft 85 of the SPM (surface permanent magnet) motor 8 shown in FIG. 10. The permanent magnet unit 7 rotates in a direction of the arrow A of FIG. 9 around a central axis 7c when incorporated in the SPM motor 8.

The insulating layers 72a, 72b, 72c and 72d of the permanent magnet unit 7 shown in FIG. 9 (b) are located on a plane passing through and parallel to the central axis 7c of the permanent magnet unit 7. The insulating layers 72c and 72d are located in a permanent magnet having two insulating layers 72a and 72b, that is, a permanent magnet 7' having a same configuration as the permanent magnet unit 6, at positions defined based on a magnitude of an eddy current Je flowing inside the permanent magnet 7'.

Specifically, the insulating layers 72c and 72d of the permanent magnet unit 7 are located on a cross section at positions where mechanical angles are θ=92° and θ=272° when the permanent magnet unit 7 is incorporated in the SPM motor 8 as shown in FIG. 10. When the permanent magnet 7' having two insulating layers 72a and 72b is incorporated in the SPM motor shown in FIG. 10 and rotated in the direction A, on each of cross sections positioned on a plane passing through and parallel to a central axis of the permanent magnet 7, the magnitude Je (θ) of the eddy current in the circumferential direction vertical to the cross section is calculated, and the insulating layers 72c and 72d are located at two positions where Je (θ) is the largest.

As stated in the above, by locating the insulating layers at positions where the magnitude of the eddy current generated in the permanent magnet 6' without any insulating layer is the largest, the eddy-current loss of the permanent magnet unit 6 can be reduced compared to the permanent magnet without any insulating layer. Similarly, by locating the insulating layers at positions where the magnitude of the eddy current generated in the permanent magnet 7' having two insulating layers is the largest, the eddy-current loss of the permanent magnet unit 7 can be reduced compared not only to the permanent magnet without any insulating layer, but also the permanent magnet unit 6 having two insulating layers.

FIG. 10 shows the SPM motor 8 of two poles and six slots used for defining the positions of the insulating layers of the permanent magnet unit shown in FIGS. 9 (a) and 9 (b). The SPM motor 8 includes a stator 82 which is a non-movable portion, and a rotor 84 which is a movable portion. The rotor 84 has the cylindrical permanent magnet 6' or permanent magnet 7' and the shaft 85, and the permanent magnet 6' or permanent magnet 7' is located such that an inner surface thereof contacts an outer surface of the shaft 85. The stator 82 includes a plurality of circumferentially spaced teeth 82a, and a magnetic coil 83 is wound around the respective teeth 82a. When the magnetic coil 83 is energized, rotating field for rotating the rotor 84 is generated. The permanent magnet 6' or permanent magnet 7' has its outer peripheral surface opposed to each of end surfaces 82b of the teeth 82a with an air gap 86 in between.

Figure 11:
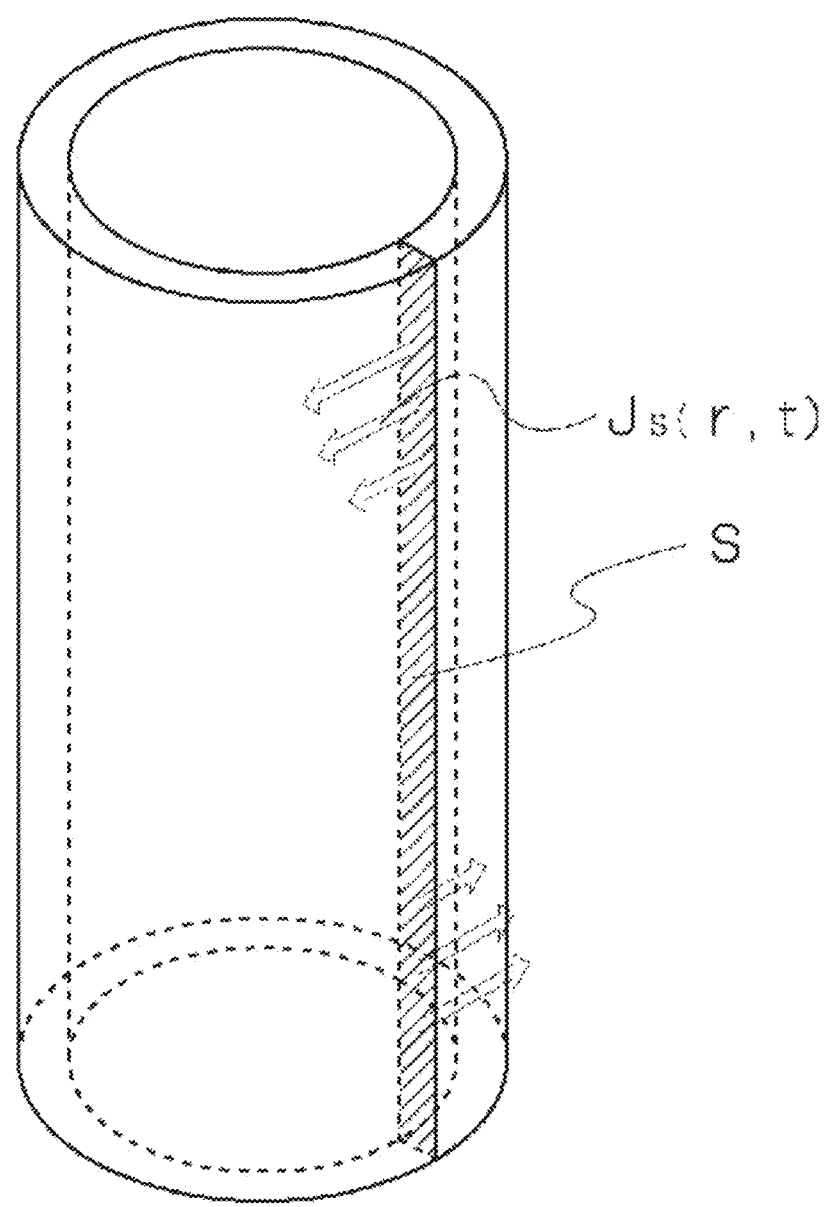
FIG. 11 shows an image of an eddy current density vector in a direction vertical to a cross section in any cross section of a cylindrical permanent magnet.

Specifications and parameters of the SPM motor 8 are shown in Table 3, and the magnitude Je (θ) of the eddy current for determining positions of the insulating layers is calculated using the following Formula (8). Je (θ) is the magnitude of the eddy current in a circumference direction generated inside the permanent magnet 6' or permanent magnet 7' when the permanent magnet 6' or permanent magnet 7' is used in the SPM motor 8 shown in FIG. 10. FIG. 11 shows an image of an eddy current density vector in any cross section of a cylindrical permanent magnet. Further, the permanent magnet in this embodiment is a parallel-oriented magnet, and an initial mechanical angle in a magnetization direction C is made as θ=60°. In addition, a positional relationship of the stator 82 and the rotor 84 shown in FIG. 10 is a position where advance angle is 0°,

TABLE 3

| Specifications | |
|---|---|
| Rated output | 2.0 kW |
| Rated speed | 150,000 rpm |
| Rated torque | 0.129 Nm |
| Radius of shaft 85 | 10.17 mm |
| Distance from center O to magnet outer surface | 12.75 mm |
| Distance from center O to end face 82b of teeth | 14.00 mm |
| Distance from center O to end face 82c of slot | 29.00 mm |
| Distance from center O to outer surface of stator 82 | 35.00 mm |
| Width of teeth 82a | 10.00 mm |
| Coil width | 5.50 mm |
| Coil thickness | 2.50 mm |
| Parameters | |
| Rated voltage | 2.96 V/phase |
| Rated current | 195 A |
| Drive frequency | 2,500 Hz |
| Coil turns | 2 turns |
| Way of coil winding | Concentrated winding |
| Material of electromagnetic steel sheet | 50A350 |
| Layered thickness of electromagnetic steel sheet | 30 mm |
| Residual magnetic flux density of permanent magnet | 1.28T (N42SH) |

[Mathematical 10]

$$J_e(\theta) = \frac{1}{T}\int_T\int_S |J_\theta(r, t)| dS dT \qquad (8)$$

Here, r is a position vector (r=(x, y, z)), t is time, θ is a circumferential position of the permanent magnet 6' or permanent magnet 7', $J_\theta$(r, t) is an eddy current density vector component in a direction vertical to a cross section positioned on a plane passing through and parallel to a central axis in the circumferential position θ of the permanent magnet 6' or 7', S is a cross-sectional area at the circumferential position θ of the permanent magnet 6' or permanent magnet 7', and T is one period the an electrical angle.

In the examples of FIG. 9 (a) and FIG. 9 (b), the circumferential component Jo (r, t) of the eddy current density vector in Formula (8) can be determined by applying the permanent magnet 6' or permanent magnet 7' as a magnet of an analysis model described in Non-Patent Documents 2 and 3, and performing an electromagnetic field analysis using a finite element method.

Conditions used for the electromagnetic field analysis in the present embodiment are as in the following.

Figure 12:
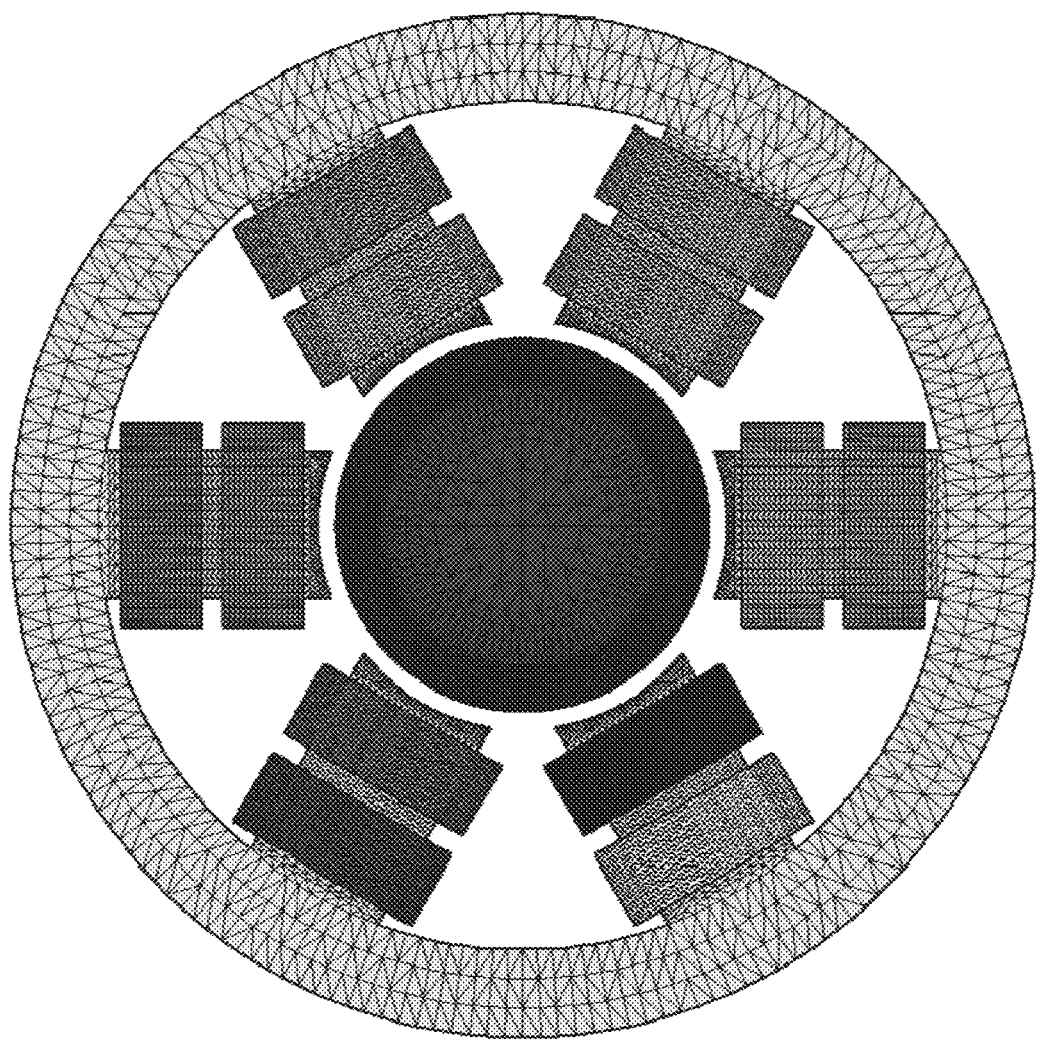
FIG. 12 is a diagram showing a two-dimensional mesh data in an analysis model used in an electromagnetic field numerical analysis in the embodiment of the present invention.

Number of elements: 1,202,244
Number of sides: 2,502,931
Number of unknowns: 2,398,363
Number of node points: 634,580
Calculating method: A–φ method
Type of elements: Pentahedron side elements Further, among the above conditions, when the number of elements is larger, the magnitude of the eddy current can be determined more accurately. FIG. 12 shows a two-dimensional mesh data in an analysis model used in the electromagnetic field analysis.

Figure 13:
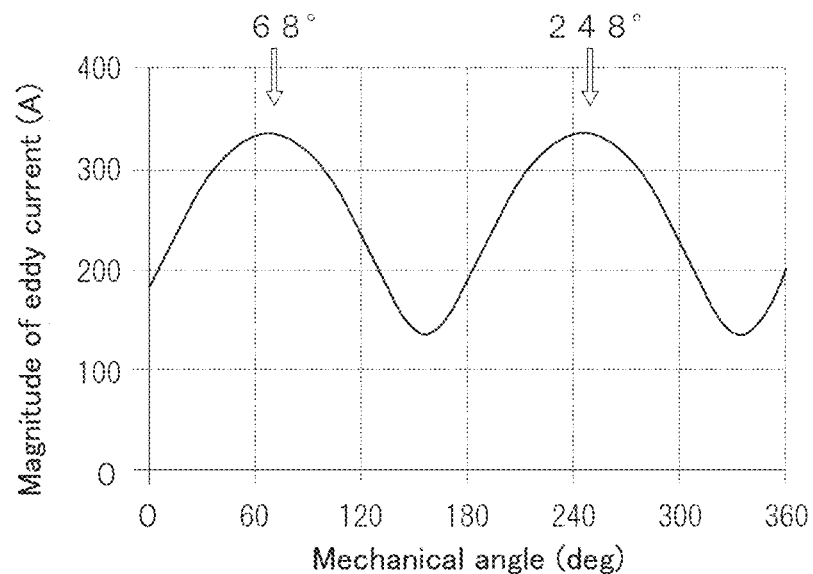
FIGS. 13(a) and (b) are diagrams showing a calculation result of a magnitude Je (θ) of an eddy current according to another embodiment of the present invention.
Figure 13:
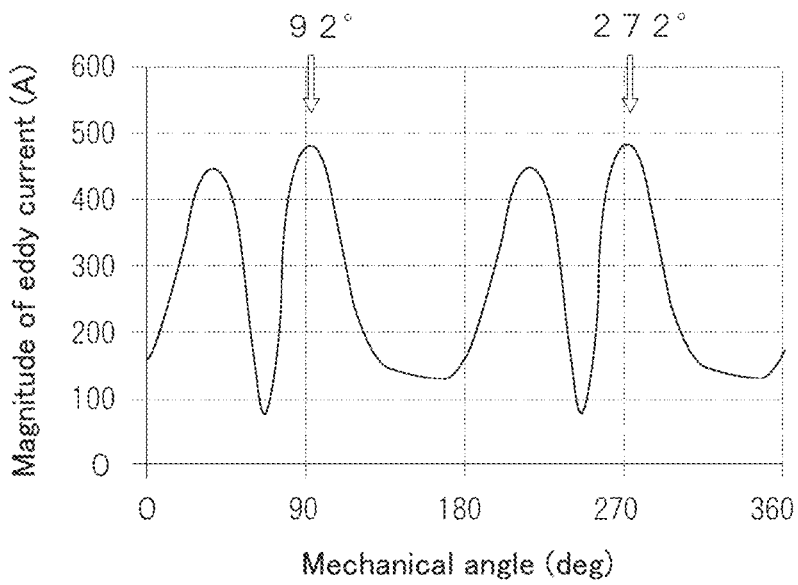

FIG. 13 (a) shows the magnitude Je (θ) of the eddy current flowing inside the permanent magnet 6' calculated as such, and FIG. 13 (b) shows the magnitude Je (θ) of the eddy current flowing inside the permanent magnet 7'. These figures plot the angle from a mechanical angle 0° to 360° as a horizontal axis, and the magnitude Je (θ) of the eddy current of a cross section at circumferential positions of the permanent magnet corresponding to respective mechanical angles as a vertical axis. In the permanent magnet 6' without any insulating layer, as shown in FIG. 13 (*a*), the magnitude Je (θ) of the eddy current became the largest at positions where the mechanical angle was 68° and 248°. Therefore, in the permanent magnet unit 6, the insulating layers 62*a* and 62*b* are located as shown in FIG. 9 (*a*). In addition, in the permanent magnet 7' where two insulating layers are located at positions shown in FIG. 9 (*a*), the magnitude Je (θ) of the eddy current became the largest at positions where the mechanical angle was 92° and 272° as shown in FIG. 13 (*b*). Therefore, in the permanent magnet unit 7, the insulating layers 72*a*, 72*b*, 72*c* and 72*d* are located as shown in FIG. 9(*b*).

For the permanent magnet units 6 and 7 where positions to locate the insulating layers are defined as such and which have them located, and the permanent magnet which has no insulating layer located, the circumferential position (mechanical angle) where the maximum value of the magnitude of the eddy current is generated, the eddy-current loss and a rate of reduction of the eddy-current loss are summarized in the following Table 4. In addition, for each of the permanent magnet unit 6 and the permanent magnet unit 7, in order to confirm the effect of a case where the insulating layers are located in the circumferential direction in which the magnitude of the eddy-current becomes the maximum, and a case where the insulating layers are located at positions other than such positions, the eddy-current loss and a rate of reduction of the eddy-current loss depending on the circumferential position of the insulating layer are summarized in the following Table 5. Further, the eddy-current loss is determined by the finite element method using the following Formula (4) as in the cases of permanent magnets 1 to 4;

TABLE 4

| | Positions where maximum value of magnitude of eddy current generated (Mechanical angle) | Eddy-current loss (W) | Rate of reduction of eddy-current loss (%) |
|---|---|---|---|
| Without insulating layer | 68°, 248° | 46.96 | — |
| Permanent magnet unit 6 (Example 5) | 92°, 272° | 44.89 | 4.41 |
| Permanent magnet unit 7 (Example 6) | — | 39.78 | 15.3 |

TABLE 5

| | Positions where insulating layers are located (Mechanical angle) | Eddy-current loss (W) | Rate of reduction of eddy-current loss (%) |
|---|---|---|---|
| Without insulating layer | — | 46.96 | — |
| Permanent magnet unit 6 (Example 5) | 60°, 240° | 44.94 | 4.30 |
| | 68°, 248° | 44.89 | 4.41 |
| | 76°, 256° | 44.90 | 4.39 |
| Permanent magnet unit 7 (Example 6) | 68°, 91°, 248°, 271° | 39.81 | 15.2 |
| | 68°, 92°, 248°, 272° | 39.78 | 15.3 |
| | 68°, 93°, 248°, 273° | 39.86 | 15.1 |

From results of Tables 4 and 5, when the permanent magnet unit and the method for defining positions to locate insulating layers according to the present invention are used, it is found that it is possible to define the positions to locate the insulating layers such that the eddy-current loss of the entire permanent magnet unit is reduced. In addition, by locating the insulating layers at positions where the magnitude of the eddy current is the largest, it is possible to further increase the reduction effect of the eddy-current loss.

Further, in the above embodiment related to the cylindrical permanent magnet, the case where the insulating layers are located on a plane parallel to the central axis is described, but the positions to locate the insulating layers are not limited thereto. The insulating layers may be located, for example, on a plane vertical to the central axis, or may be located on a plane crossing the central axis at a predetermined angle. Also, in a case where insulating layers are located on such planes, the positions to locate the insulating layers can be defined based on the method for defining positions to locate thereof according to the present invention such that the eddy-current loss of the entire permanent magnet unit is reduced. In addition, in the above embodiment related to the cylindrical permanent magnet, the parallel-oriented cylindrical permanent magnet of two poles is described, but number of poles and/or orientations is not limited thereto. For example, also in cases where polar anisotropy cylindrical permanent magnet of four and/or eight poles is used, the positions to locate the insulating layers can be defined based on the method for defining positions to locate thereof according to the present invention such that the eddy-current loss of the entire permanent magnet unit is reduced.

A method for manufacturing the permanent magnet unit according to the present invention is described in the following. In the manufacturing method, first, a permanent magnet, having a shape same as a permanent magnet unit which is targeted for considering positions to locate insulating layers, is assumed, and by the method described in the above, a magnitude of an eddy current flowing inside the permanent magnet corresponding to a change in a magnetic field of the permanent magnet is calculated, and based on such values, the positions to locate the insulating layers can be defined. In a case where a second insulating layer is to be located further, a permanent magnet unit including one insulating layer is assumed, and by the method described in the above, a position to locate the second insulating layer can be defined based on a magnitude of an eddy current flowing inside the permanent magnet unit. In a similar way, in a case where a Nth insulating layer is to be located, a permanent magnet unit having N−1 insulating layers is assumed to define a position to locate the Nth insulating layer.

After the positions to locate the insulating layers are defined, by making a permanent magnet having a shape same as a permanent magnet unit of a final product, and cutting and dividing the permanent magnet at defined positions for insulating layers, individual permanent magnet pieces included in the permanent magnet unit can be made. By opposingly locating each of the obtained permanent magnet pieces one another by the cut faces, and locating and securing an insulating adhesive material such as epoxy resin and/or silicone resin between such cut faces, a permanent magnet unit which insulating layers are of insulating adhesive material can be obtained. In addition, also by inserting the obtained permanent magnet pieces into slots provided in a movable member of a rotating machine such that each of the cut faces are opposed, and pouring an insulating adhesive material into the slots, a permanent magnet unit which insulating layers are of insulating adhesive material can be obtained. In addition, by forming each of the slots provided in the movable member of the rotating machine to a shape in which the permanent magnet unit, formed by combining the obtained permanent magnet pieces, can be inserted without any space, and combining the permanent magnet pieces to insert them into each of the slots, the permanent magnet unit may also be formed. In this case, air present in gaps between adjacent permanent magnet pieces functions as the insulating layer. Alternatively, by making a sheet of insulating layer which material is ceramics, for example, separately from permanent magnet pieces, and making the permanent magnet pieces and the sheet of insulating layer adhered by an insulating adhesive material such that cut faces of the permanent magnet pieces are opposed, a permanent magnet unit can also be manufactured.

As another method, after the positions to locate the insulating layers are defined, when the insulating layers are located at the defined positions in a permanent magnet having a shape same as a permanent magnet unit of a final product, the permanent magnet pieces which are to be adjacent to the insulating layers may be made separately. By combining and making the obtained permanent magnet pieces adjacent to each other such that faces defined as positions to locate the insulating layers are opposed, and locating and securing an insulating adhesive material such as epoxy resin and/or silicone resin between such faces, a permanent magnet unit which insulating layers are of insulating adhesive material can be obtained. In addition, also by similarly making the obtained permanent magnet pieces and inserting them into slots provided in a movable member of a rotating machine, and pouring an insulating adhesive material into the slots, a permanent magnet unit which insulating layers are of insulating adhesive material can be obtained. In addition, by molding each of the slots provided in the movable member of the rotating machine to a shape in which the permanent magnet unit, formed by combining the obtained permanent magnet pieces, can be inserted without any space, and combining the permanent magnet pieces to insert them into the slots, the permanent magnet unit may also be formed. In this case, air present in gaps between adjacent permanent magnet pieces functions as the insulating layer. Alternatively, by making a sheet of insulating layer which material is ceramics, for example, separate from the permanent magnet pieces, and making the permanent magnet pieces and the sheet of insulating layer adhered by an insulating adhesive material such that the faces defined as positions to locate the insulating layers are opposed, a permanent magnet unit can also be manufactured.

It is possible to make a permanent magnet in a case where the permanent magnet is made and divided, or each of permanent magnet pieces in a case where the permanent magnet pieces are separately made to be combined, by sintering a compact formed by powder compacting and/or a compact formed from a mixture (slurry or compound) in which magnet powders and a binder are mixed, and magnetizing the sintered body. As the most preferable method, a method is described in the following, in which a compact formed from a mixture (slurry or compound) where magnet powders and a binder are mixed is sintered to form a sintered body. FIG. 14 is a schematic diagram showing a manufacturing process of a sintered body.

First, an ingot of a magnetic material consisting of a predetermined fraction of Nd—Fe—B based alloy is manufactured by a forging process. Typically, a Nd—Fe—B based alloy used for a neodymium magnet has a composition including 30 wt % of Nd, 67 wt % of Fe which is preferably electrolytic iron, and 1.0 wt % of B. Then, the ingot is coarsely crushed to a size of about 200 μm using a known means such as a stamp mill or a crusher. Alternatively, the ingot is melted to make flakes by a strip casting process, and the flakes coarsely powdered by a hydrogen cracking process. Coarsely crushed magnet material particles 115 are thereby obtained (FIG. 14 (a)).

Next, the coarsely crushed magnet material particles 115 are finely crushed such as by a wet process using a bead mill 116, a dry process using a jet mill, or the like. For example, in the fine crushing using the wet process by the bead mill 116, the coarsely crushed magnet material particles 115 are finely crushed to a particle size of a predetermined range (for example, 0.1 μm to 5.0 μm) in a solvent, and the magnet material particles are dispersed in the solvent (refer to FIG. 14 (b)). Then, the magnet particles included in the solvent after the wet process crushing are dried by means such as vacuum drying, and the dried magnet particles are extracted (not shown). Here, a type of the solvent used for crushing is not specifically limited, alcohols such as isopropyl alcohol, ethanol, methanol, esters such as acetic ether, low hydrocarbons such as pentane, hexane, aromatics such as benzene, toluene, xylene, ketones, mixtures thereof, liquid argon, liquid nitrogen, liquid helium etc. can be used. In this case, a solvent which does not include any oxygen atom therein is preferably used.

On the other hand, in a fine crushing using the dry process by the jet mill, the coarsely crushed magnet material particles 115 are finely crushed by the jet mill in (a) an atmosphere, in which oxygen content is substantially 0%, consisting of inert gas such as nitrogen gas, Ar gas, He gas, or (b) an atmosphere, in which oxygen content is 0.0001 to 0.5%, consisting of inert gas such as nitrogen gas, Ar gas, He gas, and make them fine particles each having an average particle size of a predetermined range such as from 0.7 μm to 5.0 μm. As used herein, the oxygen content of substantially 0% is not limited to a case where oxygen content is completely 0%, and means that oxygen may be contained by an amount as much as an oxide layer is formed very slightly on surfaces of each of the fine particles.

Next, the magnet material particles finely crushed by the bead mill 116 or the like are formed to a desired shape. For the forming of the magnet material particles, a mixture, in which the magnet material particles 115 finely crushed as described in the above and a binder are mixed, is prepared. As a binder, a resin material is preferably used, and when using resins for the binder, a polymer which does not include any oxygen atom in the structure and which has depolymerization property is preferably used. In addition, as described in the following, in order to allow reuse of remnants of a mixture generated when forming the mixture of the magnet particles and the binder to a desired shape such as to a trapezoidal shape, and to allow performing magnetic field orientation under a condition where the mixture is heated and softened, a thermoplastic resin is preferably used. Specifically, a polymer consisting of one or two or more polymer or copolymer formed from a monomer shown in the following general expression (1) is preferably used.

[Chemical 1]

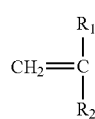

(1)

(In this regard, R1 and R2 represent hydrogen atom, lower alkyl group, phenyl group or vinyl group.)

The polymer which falls under the above conditions are, for example, polyisobutylene (PIB) which is a polymer of isobutylene, polyisoprene (isoprene rubber, IR) which is a polymer of isoprene, polybutadiene (butadiene rubber BR) which is a polymer of 1,3-butadiene, polystyrene which is a polymer of styrene, styrene-isoprene block copolymer (SIS) which is a copolymer of styrene and isoprene, butyl rubber (IIR) which is a copolymer of isobutylene and isoprene, styrene-butadiene block copolymer (SBS) which is a copolymer of styrene and butadiene, styrene-ethylene-butadiene-styrene copolymer (SEBS) which is a copolymer of styrene, ethylene and butadiene, styrene-ethylene-propylene-styrene copolymer (SEPS) which is a copolymer of styrene, ethylene and propylene, ethylene-propylene copolymer (EPM) which is a copolymer of ethylene and propylene, EPDM in which ethylene, propylene and diene monomer are copolymerized, 2-methyl-1-pentene polymerized resin which is a polymer of 2-methyl-1-pentene polymer, 2-methyl-1-butene polymerized resin which is a polymer of 2-methyl-1-butene polymer etc. In addition, the resin used for the binder may be configured as including a low amount of a polymer or copolymer (for example, polybutylmethacrylate and/or polymethylmethacrylate) of a monomer including oxygen atoms, nitrogen atoms. Also, a monomer which does not fall under the above general expression (1) may be partially copolymerized.

Further, as the resin used for the binder, a thermoplastic resin which softens at 250° C. or lower, more specifically, a thermoplastic resin which glass-transition temperature or flow starting temperature is 250° C. or lower is desirably used to appropriately perform magnetic field orientation.

In order to disperse the magnet material particles in the thermoplastic resin, it is desirable to add an appropriate amount of dispersant. As the dispersant, it is desirable to add at least one selected from the group consisting of alcohol, carboxylic acid, ketone, ether, ester, amine, imine, imide, amide, cyanogen, phosphorous functional group, sulfonic acid, compounds having an unsaturated bond such as double bond and/or triple bond, a liquid saturated hydrocarbon compound. A plurality of them may be mixed for use. As described in the following, in applying a magnetic field to the mixture of the magnet material particles and the binder for the magnetic field orientation, the process thereof is performed under a condition where the mixture is heated and the binder component is softened.

By using the binder which satisfies the above conditions as the binder to be mixed to the magnet material particles, amount of carbon and oxygen remaining in the sintered body after sintering can be reduced. Specifically, the amount of carbon remaining in the sintered body after sintering can be made as 2000 ppm or lower, more preferably 1000 ppm or lower. In addition, the amount of oxygen remaining in the sintered body after sintering can be made as 5000 ppm or lower, more preferably 2000 ppm or lower.

The additive amount of the binder may be an amount which can appropriately fill voids between the magnet material particles such that, when forming slurry or a heated and melted compound, high precision in thickness of a compact obtained as a result of the forming is improved. For example, a proportion of the binder to a total amount of the magnetic material particles and the binder is made as 1 wt % to 40 wt %, more preferably 2 wt % to 30 wt %, much more preferably 3 wt % to 20 wt %.

The mixture consisting of the magnet material particles and the binder, that is, a compound 117 is once formed to a green shaped body (hereinafter referred as "green sheet"), and then shaped to a compact for performing an orientation treatment, according to necessity. In a case specifically when the compound is formed to a sheet shape, for example, a forming by a hot melt coating process in which the compound 117, which is the mixture of the magnet material particles and the binder, is heated, and then formed to a sheet shape, or a forming by a slurry coating process in which a slurry, including the magnet material particles, the binder and an organic solvent, is coated on a substrate to be formed to a sheet shape, can be adopted.

In the following description, a green sheet forming using the hot melt coating process is specifically described, but the present invention is not limited to such specific forming method. For example, the compound 117 may be put into a forming mold, and a pressure at 0.1 MPa to 100 MPa may be applied with heating from room temperature to 300° C. for the forming. More specifically, a method may be used, where the compound 117 heated to a softening temperature is squeeze-filled by applying injection pressure into a mold for the forming.

As described earlier, by mixing the magnet material particles finely crushed by the bead mill 116 etc. with the binder, the clayey mixture consisting of the magnet material particles and the binder, that is, the compound 117 is made. Here, as the binder, the mixture of resin and dispersant can be used as described in the above. For example, as the resin, a polymer which does not include any oxygen atom in the structure and which has depolymerization property is preferable, and on the other hand, as dispersant, it is preferable to add at least one selected from the group consisting of alcohol, carboxylic acid, ketone, ether, ester, amine, imine, imide, amide, cyanogen, phosphorous functional group, sulfonic acid, and compounds having an unsaturated bond such as double bond and/or triple bond. In addition, the additive amount of the binder is made such that the proportion of the binder to a total amount of the magnetic material particles and the binder in the compound 117, after the addition described in the above, is 1 wt % to 40 wt %, more preferably 2 wt % to 30 wt %, much more preferably 3 wt % to 20 wt %.

Here, the additive amount of the dispersant is preferably determined corresponding to the particle size of each of the magnetic material particles, and it is recommended that the smaller the particle size of the magnet material particle is, the more the additive amount of the dispersant is added. As a specific additive amount, it is made as 0.1 parts to 10 parts, more preferably, 0.3 parts to 8 parts with respect to the magnetic material particles. If the additive amount is less, a dispersion effect may be small and orientation may be deteriorated. In addition, if the additive amount is much, the magnet material particles may be contaminated. The dispersant added to the magnet material particles adhere on the magnet material particles and disperse the magnet material particles to provide the clayey mixture, and also in a magnet field orientation treatment described in the following, functions to assist turning of the magnet material particles. As a result, the orientation is easily performed when a magnetic field is applied, and thus, alignment of easy axes of magnetization of each of magnet particles to a substantially same direction, that is, improvement in a degree of orientation becomes possible. Specifically, when mixing the binder to magnet material particles, since the binder becomes to exist on particle surfaces, a frictional force at the time of magnet field orientation treatment gets high, which may deteriorate the orientation of the particles, and thus, the effect of adding the dispersant is further increased.

The mixing of the magnet material particles and the binder is preferably performed under the atmosphere consisting of inert gas such as nitrogen gas, Ar gas, He gas. The mixing of the magnet material particles and the binder is performed, for example, by inputting the magnet material particles and the binder respectively into a stirring machine to stir them therein. In this case, stirring with heating may be performed to promote a kneading performance. Further, it is desirable to perform the mixing of the magnet material particles and the binder also under the atmosphere consisting of inert gas such as nitrogen gas, Ar gas, He gas. In addition, in a case specifically where the magnet particles are crushed by the wet method, the binder may be added to a solvent used for the crushing without taking out the magnet particles therefrom for kneading, and thereafter, the solvent is volatized to obtain the compound 117.

Subsequently, the green sheet described earlier is made by forming the compound 117 to a sheet shape. In a case where the hot melt coating process is adopted, the compound 117 is heated to melt thereof, and after making a state having flowability, coated on a supporting substrate 118. Then, the compound 117 is concreted by heat release to form a long sheet of green sheet 119 on the supporting substrate 118. In this case, a temperature in heating and melting the compound 117 varies depending on types and/or amounts of the binder used, but generally, it is 50° C. to 300° C. However, it is necessary to make the temperature higher than a flow starting temperature of the binder used. Further, when the slurry coating process is used, magnet material particles, binder, and optionally, an additive which facilitates orientation are dispersed in a large quantity of solvent to coat the slurry on the supporting substrate 118. Then, the solvent is dried to be vaporized to form a long sheet of green sheet 119 on the supporting substrate 118.

Here, for the coating method of the melted compound 117, a method having an excellent layer thickness controllability such as a slot die method or calendar roll method is preferably used. Specifically, in order to achieve a high accurate thickness, it is desirable to use a die method and/or comma coating method which is a method having the excellent layer thickness controllability, that is, a method allowing for coating a layer with a thickness of high precision on a surface of a substrate. For example, in the slot die method, the compound 117 heated to a state having flowability is fed by a gear pump into a die, and discharged from the die for coating. In addition, in the calendar roll method, a controlled amount of the compound 117 is fed to a gap between a nip of two heated rolls, and with the rolls being rotated, the compound 117 melted by heat of the rolls is coated on the supporting substrate 118. As the supporting substrate 118, for example, a silicone-treated polyester film may preferably be used. In addition, it is preferable to sufficiently go through a defoaming process so that no bubbles remain in a layer of the compound 117 coated and developed, by using a defoaming agent, or performing a vacuum heating defoaming process. Alternatively, not by coating on the supporting substrate 118, the compound 117 melted by extrusion molding and/or injection molding may be extruded on the supporting substrate 118, with being formed to a sheet shape, to form the green sheet 119 on the supporting substrate 118.

In the embodiment shown in FIG. 14, a slot die 120 is used to perform the coating of the compound 117. In this forming process of the green sheet 119 by the slot die method, it is desirable to actually measure a sheet thickness of the green sheet after the coating, and to adjust the nip gap between the slot die 120 and the supporting substrate 118 by a feedback control based on the actual measured value. In this case, it is desirable to reduce variation in amount of the flowable compound 117 supplied to the slot die 120 as much as possible, for example to suppress the variation at ±0.1 or lower, and further reduce variation in a coating speed as much as possible, for example to suppress the variation at ±0.1 or lower. By such control, it is possible to improve the thickness accuracy of the green sheet 119. Further, the thickness accuracy of the green sheet 119 to be formed, is preferably made as within ±10%, more preferably within ±3%, much more preferably within ±1% with respect to a designed value such as 1 mm. In the calendar roll method, by performing a feedback control of calendaring conditions based on the actual value similarly, it is possible to control a film thickness of the compound 117 transferred to the supporting substrate 118.

The thickness of the green sheet 119 is desirably set in a range of 0.05 mm to 20 mm. If the thickness is made thinner than 0.05 mm, it becomes necessary to laminate a plurality of layers so as to achieve a required magnet thickness, resulting in a decline in productivity.

Next, processing pieces are made, and each of which is cut from the green sheet 119 formed on the supporting substrate 118 by the hot melt coating process described in the above, to be a size corresponding to a desired magnet size (for example, the permanent magnet unit 1 of FIG. 1 (a), or the permanent magnet pieces 10a, 10b included in the permanent magnet unit 1). The size of the working piece is defined such that a predetermined magnet size may be obtained after a sintering process described in the following, considering a size reduction in the sintering process. A magnetic field in a necessary direction is applied to the processing pieces, and thus, the easy magnetization axes of each of the magnet particles included in the processing pieces is oriented in the magnetic field direction. To be specific, the processing pieces is contained in a mold for applying magnetic field having a cavity with a shape corresponding to that of the processing pieces, and heated to soften the binder included in the processing pieces. This allows the magnet material particles to be turned within the binder, and the easy magnetization axes thereof may be oriented in a direction along a parallel magnetic field.

Temperature and time for heating the processing pieces vary depending on types and amounts of the binder used, but for example, they are made as 0.1 to 60 minutes at 40° C. to 250° C. At any rate, in order to soften the binder in the processing pieces, it is necessary to make the heating temperature as a temperature at a glass-transition temperature or flow starting temperature or higher of the binder used. Means for heating the processing pieces includes, for example, heating by a hot plate, or a method using a heat medium such as silicone oil as a heat source. The strength of the magnetic field in applying thereof may be 5000 [Oe] to 150000 [Oe], and preferably 10000 [Oe] to 120000 [Oe]. As a result, the easy magnetization axes of each of the magnet material particles included in the processing pieces is oriented in parallel alignment in a direction along a parallel magnetic field. In this magnetic field application process, a configuration, where the magnetic field is applied to a plurality of processing pieces simultaneously, is also possible. To allow for such configuration, a mold having a plurality of cavities may be used, or a plurality of molds may be aligned to apply a parallel magnetic field simultaneously. The process of applying the magnetic field to the processing pieces may be performed simultaneously with the heating process, or may be performed after the heating process and before the binder of the processing pieces is concreted.

Next, each of the processing pieces, which the easy magnetization axes of each of the magnet material particles are oriented in parallel alignment by the magnetic field application process, is extracted from the mold for applying magnetic field, transferred inside a final shaping mold having a required shape to be formed into each of processing pieces for sintering process. The processing pieces for the sintering process after orientation, in which the easy magnetization axes of each of the magnet material particles is oriented, are held at a binder decomposition temperature in a non-oxidizing atmosphere adjusted to an atmospheric pressure or a pressure higher or lower than the atmospheric pressure (for example, 1.0 p Pa or 1.0 MPa) for a few hours to several tens of hours (for example, five hours) to perform a calcining treatment. In this treatment, a hydrogen atmosphere or a mixed gas atmosphere of hydrogen and inert gas is recommended for use. When the calcining treatment is performed under the hydrogen atmosphere, a supply amount of hydrogen during the calcination may be made as 5 L/min, for example. By performing the calcining treatment, an organic compound included in the binder may be decomposed into a monomer by a depolymerization reaction or other reaction, and be scattered to remove thereof. That is, a decarbonization treatment, which is a treatment for reducing an amount of carbon remaining in the processing pieces for sintering process, is performed. In addition, it is desirable to perform the calcining treatment under a condition where the amount of carbon remaining in the processing pieces for sintering process is 2000 ppm or lower, preferably 1000 ppm or lower. All of the processing pieces for sintering process may be thereby densely sintered in the subsequent sintering process, and lowering of residual magnetic flux density and magnetic coercive force may be suppressed. Further, when a pressurizing condition in performing the calcining treatment described in the above is made as a pressure higher than the atmospheric pressure, the pressure is desirable to be 15 MPa or lower. Here, if the pressurizing condition is made as a pressure higher than the atmospheric pressure, more particularly, 0.2 MPa or higher, a reduction effect of the residual carbon amount can be expected in particular.

The binder decomposition temperature can be determined based on analysis results of a binder decomposition product and decomposition residue. The temperature may vary depending on types of binders, but may be made as 200° C. to 900° C., more preferably 400° C. to 600° C., for example, 450° C.

In the above calcination process described in the above, it is preferable to lower a rate of temperature increase compared to that of a sintering process of a general rare earth magnet Specifically, by making the rate of temperature increase as 2 μmin or lower, for example, 1.5° C./min or lower, a preferable result can be obtained. Therefore, when performing the calcination process, the temperate is increased at a predetermine rate of temperature increase of 2° C./min or lower, and after a predetermined preset temperature (binder decomposition temperature) is achieved, the pre-set temperature is held for a few hours to a several tens hours to perform the calcining treatment. By lowering the rate of temperature increase in the calcination process as such, carbon in the processing pieces for sintering process may be removed gradually, not rapidly, and thus, the residual carbon may be reduced to a sufficient level to increase a density of the sintered body after the sintering. That is, by reducing the residual carbon amount, voids in the permanent magnet can be reduced. As described in the above, when the rate of temperature increase is about 2° C. or lower, the density of the sintered body after sintering may be 98% or higher (7.40 g/cm³ or higher), and a high magnetic property can be expected to be achieved in a magnet after magnetizing.

Subsequently, a sintering process for sintering the processing pieces for sintering process calcinated by the calcining treatment is performed. As the sintering process, a non-pressurized sintering method in vacuum may be adopted, but in the present embodiment, an uniaxial pressing sintering method, in which processing pieces for sintering process are sintered, with the processing pieces being uniaxially pressurized in a direction vertical to an orientation direction (a direction parallel to the easy magnetization axes), is preferably adopted. In this method, the processing pieces for sintering process are loaded in a sintering mold having a cavity with a shape which is the same as a required permanent magnet or a permanent magnet piece, and the mold is closed to perform the sintering while being pressed. As this pressing sintering technique, any of known techniques such as a hot press sintering, a hot isostatic press (HIP) sintering, an ultrahigh pressure synthetic sintering, a gas pressurization sintering, a spark plasma sintering (SPS) may be adopted. Specifically, the hot press sintering which allows uniaxial pressurizing is preferably used.

Further, when the sintering is performed by the hot press sintering, it is preferred that, the pressure for pressurization is made as 0.01 MPa to 100 Mpa, for example, and the temperature is increased at a rate of temperature increase of 5° C.-30° C./min. up to 900° C.-1100° C. in a vacuum atmosphere of a few Pa or lower, and then held for five minutes. Then cooled, and the temperature is increased again up to 300° C.-1000° C., and a heat treatment of keeping the temperature for two hours is performed. As a result of such sintering process, a sintered body of a required shape is manufactured from the processing pieces for sintering process. Thus, according to the uniaxial pressing sintering method, in which the processing pieces for sintering process are sintered, with the processing pieces being pressurized in the necessary direction, it is possible to suppress a change in the orientation of the easy magnetization axes provided to each of the magnet material particles in the processing pieces for sintering process.

Magnetization is performed to the sintered body, along the easy magnetization axes of each of the magnet material particles included therein, that is a C axis, and as a result, a permanent magnet for performing a dividing process, or a permanent magnet pieces included in the permanent magnet unit can be manufactured. Further, for the magnetization of the sintered body, any of known means such as magnetizing coils, a magnetizing yoke, a condenser type magnetizing power supply device may be used.

REFERENCE SIGNS LIST 1, 2, 3, 4, 6, 7: permanent magnet unit
1', 2', 3', 6', 7': permanent magnet
10a, 10b: permanent magnet piece
12: insulating layer
20a, 20b, 20c: permanent magnet piece
22a, 22b, 22c: insulating layer
30a, 30b: permanent magnet piece
32: insulating layer
40a, 40b, 40c, 40d: permanent magnet piece
42a, 42b, 42c: insulating layer
60a, 60b: permanent magnet piece
62a, 62b: insulating layer
70a, 70b, 70c, 70d: permanent magnet piece
72a, 72b, 72c, 72d: insulating layer A: moving direction
5: IPM motor
52: stator
52a: teeth
53: magnetic field coil
54: rotor
54a: rotor core
54b: shaft
54c: slot for inserting magnet
55: air gap
8: SPM motor
82: stator
82a: teeth
83: magnetic field coil
84: rotor
85: shaft
86: air gap
115: coarsely crushed magnet material particles
116: bead mill
117: compound
118: supporting substrate
119: green sheet
120: slot die

The invention claimed is:

1. A permanent magnet unit including:
   at least one insulating layer; and
   a plurality of permanent magnet pieces located adjacent to each other with the at least one insulating layer in between,
   wherein
   the at least one insulating layer is located at positions defined based on a magnitude of an eddy current flowing inside a first permanent magnet, corresponding to a change in a magnetic field of the permanent magnet,
   the first permanent magnet is defined by the plurality of the permanent magnet pieces integrally formed without the at least one insulating layer, and
   the magnitude of the eddy current is calculated using the following formula, for any cross section ξ of the first permanent magnet, as a magnitude Je (ξ) of an eddy current in a direction vertical to the cross section ξ:

[Mathematical 1]

$$J_e(\xi) = \frac{1}{T} \int_T \int_S |J_S(r, t)| dS dT,$$

wherein r represents a position vector, t represents time, Js (r, t) represents an eddy current density vector component in a direction vertical to a cross section ξ in the cross section of the first permanent magnet, S represents a cross-sectional area of the cross section ξ of the first permanent magnet, and T represents one period of an electrical angle.

2. The permanent magnet unit according to claim 1, wherein
   the permanent magnet unit includes N (N is an integer of 1 or more) insulating layers and N+1 permanent magnet pieces, and is configured by each of the N insulating layers and each of the N+1 permanent magnet pieces being adjacent to each other,
   the Nth insulating layer is located on a cross section where the magnitude Je (ξ) of the eddy current flowing inside the first permanent magnet ranges from 95% of the maximum to the maximum, and
   the first permanent magnet is defined as N−1 insulating layers and N permanent magnet pieces integrally formed without the Nth insulating layer.

3. The permanent magnet unit according to claim 2, wherein the permanent magnet unit is incorporated to be used in a rotating machine, and has a length direction (x direction) dimension extending in a direction moving across a magnetic field of the rotating machine, a height direction (z direction) dimension vertical to the length direction and parallel to an axial direction of the rotating machine, and a thickness direction (y direction) dimension vertical to the length direction and the height direction, and
   the Nth insulating layer is located on a cross section vertical to the length direction at a position where a magnitude Je (x) of an eddy current in the length direction vertical to a cross section in the length direction x of the first permanent magnet ranges from 95% of the maximum to the maximum, calculated by the following formula;

[Mathematical 2]

$$J_e(x) = \frac{1}{T} \int_T \int_S |J_x(r, t)| dS dT$$

wherein r represents a position vector, t represents time, Jx (r, t) represents an eddy current density vector component in the length direction at a position x of the first permanent magnet including N−1 insulating layers and N permanent magnet pieces without the Nth insulating layer, S represents a cross-sectional area vertical to the length direction at the position x of the first permanent magnet, and T represents one period of an electrical angle.

4. The permanent magnet unit according to claim 2, wherein the permanent magnet unit is incorporated to be used in a rotating machine, and has a length direction (x direction) dimension extending in a direction moving across a magnetic field of the rotating machine, a height direction (z direction) dimension vertical to the length direction and parallel to an axial direction of the rotating machine, and a thickness direction (y direction) dimension vertical to the length direction and the height direction, and
   the Nth insulating layer is located on a cross section vertical to the height direction at a position where a magnitude Je (z) of an eddy current in the height direction vertical to a cross section in the height direction z of the first permanent magnet ranges from 95% of the maximum to the maximum, calculated by the following formula;

[Mathematical 3]

$$J_e(z) = \frac{1}{T} \int_T \int_S |J_z(r, t)| dS dT$$

wherein r represents a position vector, t represents time, Jz (r, t) represents an eddy current density vector component in the height direction at a position z of the first permanent magnet including N−1 insulating layers and N permanent magnet pieces without the Nth insulating layer, S represents a cross-sectional area vertical to the height direction at the position z of the first permanent magnet, and T represents one period of an electrical angle.

5. The permanent magnet unit according to claim 1, wherein the at least one insulating layer is an insulating material layer an air layer or a combination thereof.

6. The permanent magnet unit according to claim 5, wherein the at least one insulating layer is a layer including fluoride of a rare-earth element, a layer of an insulating resin adhesive material or a combination thereof.

7. The permanent magnet unit according to claim 1, wherein the permanent magnet unit is a Nd—Fe—B based permanent magnet.

8. A rotating machine having a rotor core rotatably located inside a stator so as to be opposed to the stator through an approximately cylindrical-shaped air gap having a central axis parallel to a rotating axis, wherein the rotor core is formed with a plurality of slots each having a lengthwise cross section with a length direction dimension and a thickness direction dimension and extending in an axial direction, the plurality of slots being arranged at positions spaced apart from each other in a circumferential direction of the rotor core, and the permanent magnet unit according to claim 1 is located inside each of the slots.

9. A method for manufacturing a permanent magnet unit including at least one insulating layer, and a plurality of permanent magnet pieces located adjacent to each other with the at least one insulating layer in between, the method comprising steps of:
   determining a magnitude of an eddy current flowing inside a first permanent magnet, corresponding to a change in a magnetic field of the first permanent magnet, wherein the first permanent magnet is defined as the plurality of the permanent magnet pieces integrally formed without the at least one insulating layer;
   defining positions to locate the at least one insulating layer in the first permanent magnet based on the determined magnitude of the eddy current;
   making the plurality of the permanent magnet pieces to be located adjacent to the at least one insulating layer having the defined position to be located; and
   locating the made plurality of permanent magnet pieces adjacent to each other with the at least one insulating layer in between,
   wherein the step of determining the magnitude of the eddy current comprises, for any cross section ξ of the first permanent magnet, calculating a magnitude Je (ξ) of an eddy current in a direction vertical to the cross section ξ using the following formula:

[Mathematical 4]

$$J_e(\xi) = \frac{1}{T}\int_T\int_S |J_S(r, t)| dS dT$$

wherein r represents a position vector, t represents time, Js (r, t) represents an eddy current density vector component in a direction vertical to a cross section ξ, in the cross section of the first permanent magnet, S represents a cross-sectional area of the cross section ξ of the first permanent magnet, and T represents one period of an electrical angle.

10. The method according to claim 9, wherein the step of making the plurality of the permanent magnet pieces comprises making a permanent magnet corresponding to the first permanent magnet, and cutting the permanent magnet at positions defined as the positions to locate the at least one insulating layer for dividing the permanent magnet into the plurality of permanent magnet pieces, and
the step of locating the plurality of the permanent magnet pieces comprises locating the plurality of the permanent magnet pieces such that cut faces of each of the permanent magnet pieces are opposed.

11. The method according to claim 9, wherein
the first permanent magnet is defined as N−1 (N is an integer of 1 or more) insulating layers and N permanent magnet pieces integrally formed without an Nth insulating layer,
the step of defining the positions to locate the insulating layers comprises determining a location of the Nth insulating layer, wherein the Nth insulating layer is located on a cross section where the magnitude Je (ξ) of the eddy current ranges from 95% of the maximum to the maximum.

12. The method according to claim 11, wherein
the permanent magnet unit is incorporated to be used in a rotating machine, and has a length direction (x direction) dimension extending in a direction moving across a magnetic field of the rotating machine, a height direction (z direction) dimension vertical to the length direction and parallel to an axial direction of the rotating machine, and a thickness direction (y direction) dimension vertical to the length direction and the height direction,
the step of determining the magnitude of the eddy current comprises, for a cross section at a position x in the length direction of the first permanent magnet, calculating a magnitude Je (x) of an eddy current in the length direction vertical to the cross section using the following formula,

[Mathematical 5]

$$J_e(x) = \frac{1}{T}\int_T\int_S |J_x(r, t)| dS dT$$

wherein r represents a position vector, t represents time, Jx (r, t) represents an eddy current density vector component in the length direction at the position x of the first permanent magnet, S represents a cross-sectional area of the cross section at the position x of the first permanent magnet, and T represents one period of an electrical angle, and
the Nth insulating layer is located on a cross section vertical to the length direction at a position where the magnitude of Je (x) ranges from 95% of the maximum to the maximum.

13. The method according to claim 11, wherein
the permanent magnet unit is incorporated to be used in a rotating machine, and has a length direction (x direction) dimension extending in a direction moving across a magnetic field of the rotating machine, a height direction (z direction) dimension vertical to the length direction and parallel to an axial direction of the rotating machine, and a thickness direction (y direction) dimension vertical to the length direction and the height direction,
the step of determining the magnitude of the eddy current comprises, for a cross section at a position z in the height direction of the permanent magnet, calculating a magnitude Je (z) of an eddy current in the height direction vertical to the cross section using the following formula,

[Mathematical 6]

$$J_e(z) = \frac{1}{T}\int_T\int_S |J_z(r, t)|dSdT$$

wherein r represents a position vector, t represents time, Jz (r, t) represents an eddy current density vector component in the height direction at the position z of a permanent magnet, S represents a cross-sectional area of the cross section at the position z of the permanent magnet, and T represents one period of an electrical angle, and
the Nth insulating layer is located on a cross section vertical to the height direction at a position where the magnitude of Je (z) ranges from 95% of the maximum to the maximum.

* * * * *